US012748175B2

(12) United States Patent
Frederick et al.

(10) Patent No.: US 12,748,175 B2
(45) Date of Patent: Sep. 29, 2026

(54) DEVICE, SYSTEM, AND METHOD FOR MONITORING OCCUPANCY OF HAZARDOUS WORK AREAS

(71) Applicant: MAKUSAFE CORP., West Des Moines, IA (US)

(72) Inventors: Mark Frederick, Cumming, IA (US); Gabriel Glynn, Ankeny, IA (US); Matthew McMullen, Omaha, NE (US)

(73) Assignee: MAKUSAFE CORP., West Des Moines, IA (US)

( * ) Notice: Subject to any disclaimer, the term of this patent is extended or adjusted under 35 U.S.C. 154(b) by 272 days.

(21) Appl. No.: 18/636,805

(22) Filed: Apr. 16, 2024

(65) Prior Publication Data

US 2024/0345206 A1 Oct. 17, 2024

Related U.S. Application Data

(60) Provisional application No. 63/496,584, filed on Apr. 17, 2023.

(51) Int. Cl.
*G01S 5/14* (2006.01)

(52) U.S. Cl.
CPC .................................... *G01S 5/14* (2013.01)

(58) Field of Classification Search
CPC ........................................................ G01S 5/14
USPC ...................................................... 340/686.1
See application file for complete search history.

(56) References Cited

U.S. PATENT DOCUMENTS 10,392,205 B2 * 8/2019 Boston .................. G08B 21/02
10,454,971 B2 10/2019 Chalmers
12,109,015 B1 10/2024 Kiran
2014/0308930 A1 10/2014 Tran
2015/0099945 A1 4/2015 Hawkins, III
2015/0223743 A1 8/2015 Pathangay et al.
2017/0352242 A1 * 12/2017 Glynn ................ G08B 21/0469
(Continued)

FOREIGN PATENT DOCUMENTS

WO 2022013738 A1 1/2022

OTHER PUBLICATIONS

—S. Banerjee M. Hempel and H. Sharif "A review of workspace challenges and wearable solutions in railroads and construction" 2017 13th International Wireless Communications and Mobile Computing Conference (IWCMC) Valencia Spain 2017 pp. 91-96 doi: B13.

*Primary Examiner* — Travis R Hunnings
(74) *Attorney, Agent, or Firm* — Christopher A. Proskey; BrownWinick Law Firm

(57) ABSTRACT

In one or more arrangements, a safety system is presented. The system includes a plurality of wearable devices, a worker detection system, and a control system, among other components. The plurality of wearable devices are configured to be worn by workers during a work shift. The worker detection system is configured to detect presence of the workers by detecting the wearable devices worn by the workers. The control system is configured to track workers present based on detection of the plurality of wearable devices by the worker detection system and control operation of a safety device is configured to prevent injury to workers present in a first area when the safety device is enabled. In one or more arrangements, the control system is configured to prevent the safety device from being disabled when the control system determines one or more workers are present.

36 Claims, 11 Drawing Sheets

(56) References Cited

U.S. PATENT DOCUMENTS

| | | | | |
|---|---|---|---|---|
| 2019/0114573 | A1 | 4/2019 | Moore | |
| 2019/0343429 | A1* | 11/2019 | Elhawary | A61B 5/6823 |
| 2020/0193341 | A1 | 6/2020 | Barak et al. | |
| 2020/0297250 | A1* | 9/2020 | Elhawary | A61B 5/1123 |
| 2021/0158207 | A1 | 5/2021 | Alsahlawi et al. | |
| 2021/0264764 | A1* | 8/2021 | Glynn | G08B 25/016 |
| 2021/0383261 | A1 | 12/2021 | Hanna | |
| 2022/0277254 | A1 | 9/2022 | Feeney | |
| 2022/0313118 | A1* | 10/2022 | Elhawary | G06F 18/00 |
| 2023/0005613 | A1 | 1/2023 | Race et al. | |
| 2023/0098677 | A1* | 3/2023 | Liu | G06V 10/147<br>382/103 |
| 2023/0101794 | A1* | 3/2023 | Liu | G06T 7/40<br>382/108 |
| 2024/0087444 | A1 | 3/2024 | Bucchieri | |

* cited by examiner

DEVICE, SYSTEM, AND METHOD FOR MONITORING OCCUPANCY OF HAZARDOUS WORK AREAS

CROSS REFERENCE TO RELATED APPLICATIONS

This application claims priority to U.S. provisional patent application 63/496,584 filed Apr. 17, 2023 and titled "DEVICE, SYSTEM, AND METHOD FOR MONITORING OCCUPANCY OF HAZARDOUS WORK AREAS", which is hereby fully incorporated by reference herein.

This application is also related to U.S. Patent Application 63/438,294 filed Jan. 11, 2023 and titled "DEVICE, SYSTEM AND METHOD FOR ASSESSING WORKER RISK" and U.S. patent application Ser. No. 17/962,827 filed Oct. 10, 2022 and titled "DEVICE, SYSTEM AND METHOD FOR OPTIMIZING OPERATION OF A PRODUCTION LINE", which claims priority to U.S. Provisional Patent Application 63/255,110 filed on Oct. 13, 2021 and titled "DEVICE, SYSTEM AND METHOD FOR OPTIMIZING OPERATION OF A PRODUCTION LINE", each of which is hereby fully incorporated by reference herein.

FIELD OF THE DISCLOSURE

This disclosure generally relates to monitoring systems. More specifically and without limitation, this disclosure relates to a monitoring system utilizing wearable devices to gather information indicative of a worker location and other information pertaining to analysis of risk posed to workers.

OVERVIEW OF THE DISCLOSURE

Commercial and industrial settings often have particular areas that expose workers to safety hazards should be evacuated of personnel before engaging in certain activities. As one example, loading docks can be particularly dangerous when trucks are arriving or departing. For example, if a truck or shipping container is moved while personnel are unloading, serious injury may occur. To prevent this scenario from occurring, some existing systems may be employed to secure a truck or shipping container in place prior to unloading. In this manner, the truck or shipping container is prevented from being moved without someone first disconnecting the truck or shipping container from the dock. However, it can be difficult to keep track of personnel when loading/unloading trucks. This is particularly true in instances when, as is often the case, only a portion of the cargo is being loaded or unloaded. Other cargo present on the truck or shipping container may make it difficult to visually confirm if any personnel are present.

Most, if not all of these work-related injuries are avoidable. In view of the personal cost to the injured worker and the financial cost to the employer, a great amount of energy and effort has been placed on avoiding workplace injuries. Many employers have implemented various systems to avoid accidents ranging from common sense solutions to sophisticated systems, from establishing safety teams and safety managers to hiring third-party safety auditors, and everything in-between. However, despite these many efforts, avoidable injuries continue to occur at an alarming pace.

Therefore, there is a need in the art to provide a device, system and method of use for managing operation of safety devices.

Thus, it is a primary object of the disclosure to provide a wearable device, system and method of use that improves upon the state of the art.

Another object of the disclosure is to provide a system and method for managing operation of safety equipment using a worker detection system.

Yet another object of the disclosure is to provide a system and method for managing operation of safety equipment based on presence of workers.

Another object of the disclosure is to provide a system and method for managing operation of safety equipment using wearable devices to track presence of workers.

Yet another object of the disclosure is to provide a wearable device, system and method that more accurately tracks location of workers during a work shift.

Another object of the disclosure is to provide a wearable device, system and method of use that aggregates a great amount of information about the work performed by workers and workplace conditions.

Yet another object of the disclosure is to provide a wearable device, system and method of use that eliminates bias in the collection of information about the work performed by workers and workplace conditions.

Another object of the disclosure is to provide a wearable device, system and method of use that eliminates the inconsistency in reporting information about the work performed by workers and workplace conditions.

Yet another object of the disclosure is to provide a wearable device, system and method of use that analyzes data gathered to assess risk posed to workers at multiple times throughout a work shift.

Another object of the disclosure is to provide a wearable device, system and method of use that aggregates a great amount of information indicative of work performed by workers and workplace conditions to facilitate data analytics.

Yet another object of the disclosure is to provide a wearable device, system and method of use that assesses gathered data indicative of work performed by workers and workplace conditions to facilitate assessment of safety risks faced by workers during a work shift.

Another object of the disclosure is to provide a wearable device, system and method of use that is safe to use.

Yet another object of the disclosure is to provide a wearable device, system and method of use that is easy to use.

Another object of the disclosure is to provide a wearable device, system and method of use that is efficient to use.

Yet another object of the disclosure is to provide a wearable device, system and method of use that is durable.

Another object of the disclosure is to provide a wearable device, system and method of use that is robust.

Yet another object of the disclosure is to provide a wearable device, system and method of use that is cost effective.

Another object of the disclosure is to provide a wearable device, system and method of use that can be used with a wide variety of facilities.

Another object of the disclosure is to provide a wearable device, system and method of use that is high quality.

Yet another object of the disclosure is to provide a wearable device, system and method of use that has a long useful life.

Another object of the disclosure is to provide a wearable device, system and method of use that can be used with a wide variety of occupations.

Yet another object of the disclosure is to provide a wearable device, system and method of use that provides high quality data.

Another object of the disclosure is to provide a wearable device, system and method of use that provides data and information that can be relied upon.

These and countless other objects, features, or advantages of the present disclosure will become apparent from the specification, figures, and claims.

SUMMARY OF THE DISCLOSURE

In one or more arrangements, a system for controlling a safety device is presented. The system includes a plurality of wearable devices, the safety device, a worker detection system, and a control system, among other components. The plurality of wearable devices are configured to be worn by workers during a work shift. The safety device is configured to prevent injury to workers present in a first area when the safety device is enabled. The worker detection system is configured to detect presence of the workers by detecting the wearable devices worn by the workers. The control system is communicatively connected to the worker detection system. The control system is configured to track workers present in the first area based on detection of the plurality of wearable devices by the worker detection system. In one or more arrangements, the control system is configured to prevent the safety device from being disabled when the control system determines one or more workers are present in the first area. In one or more arrangements, the control system is configured to permit the safety device to be disabled when the control system determines no workers are present in the first area.

In one or more arrangements, the worker detection system is configured to detect presence of the plurality of wearable devices in a first area and in a second area that is separate from the first area. In one or more arrangements, the control system is configured to presume workers previously detected in the first area remain present in the first area until presence of the workers is detected in the second area. In one or more arrangements, the worker detection system is configured to provide control system data indicative of location of the workers (e.g., GPS data). In one or more arrangements, based on such data, control system is configured to track positions of the workers and occupancy in one or more areas during the work shift.

DETAILED DESCRIPTION OF THE DISCLOSURE

Figure 1:
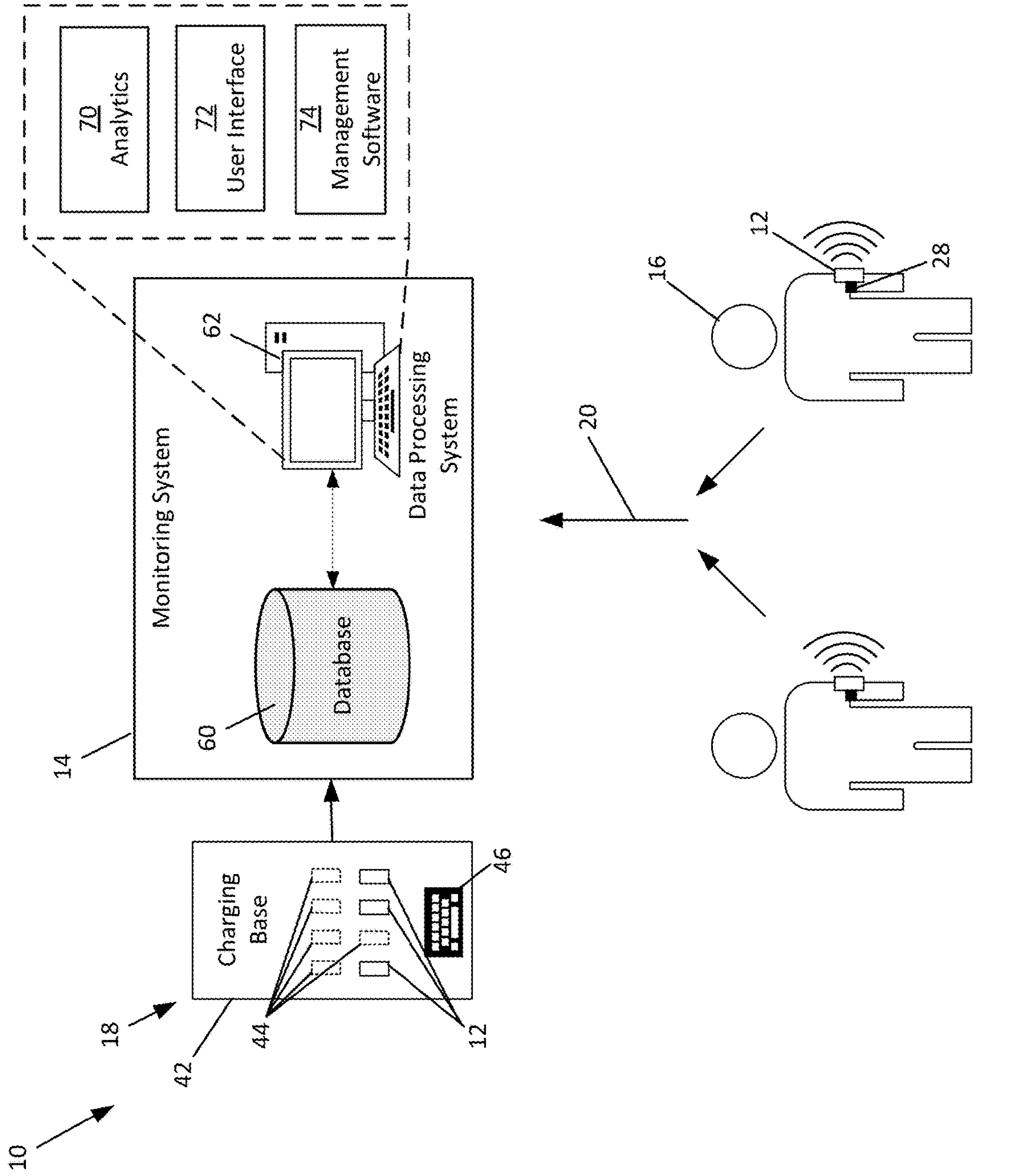
FIG. 1 shows a system for monitoring worker status and/or working conditions, in accordance with one or more arrangements; the system utilizing wearable devices worn by workers to facilitate the monitoring worker status and/or working conditions.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

Any advantages and/or improvements discussed herein may not be provided by various disclosed embodiments, and/or implementations thereof. The contemplated embodiments are not so limited and should not be interpreted as being restricted to embodiments which provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments which address such objects of the disclosure and/or invention. Furthermore, although some disclosed embodiments may be described relative to specific materials, the embodiments are not limited to the specific materials and/or apparatuses but only to their specific characteristics and capabilities and other materials and apparatuses can be substituted as is well understood by those skilled in the art in view of the present disclosure.

It is to be understood that the terms such as "left, right, top, bottom, front, backrest, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of such articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected and/or engaged, respectively, in any manner that facilitates operation, which may include being directly connected, indirectly connected, electronically connected, wirelessly connected and/or connected by any other manner, method and/or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments and/or methods.

Similarly, the structures and operations discussed herein may occur out of the order described and/or noted in the figures. For example, two operations and/or figures shown in succession may in fact be executed concurrently and/or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of controlling operation of safety devices for shipping facilities. However, the embodiments are not so limited. It is appreciated that the embodiments may be adapted for use with other devices and/or in other applications which may be improved by the disclosed structures, arrangements and/or methods. The system is merely shown and described as being used in the context of safety devices for shipping facilities for ease of description and as one of countless examples.

System 10

With reference to the figures, a system for monitoring worker status and/or working conditions 10 is presented (system 10). In one or more arrangements, system 10 includes a plurality of wearable devices 12 and a monitoring system 14 among other components.

Wearable Devices 12

Wearable devices 12 are formed of any suitable size, shape, and design and are configured to facilitate worker 16 presence and/or location detection and/or recording of information indicative worker health and/or status during a work shift. In one or more arrangements, wearable devices 12 are configured to facilitate tracking location of worker during work shift, and/or proximity to high risk area by system 10. Additionally or alternatively, in one or more arrangements, wearable devices 12 are configured to facilitate recording of air quality, sound levels, data indicative of physicality of tasks performed by workers such as heart rate, temperature, perspiration level, number of steps, distance traveled, accelerometer data, and/or other data acquired by sensors 22 of wearable devices 12.

In one or more arrangements, system 10 may include wearable devices 12, charging base 18 and/or other components implemented as described in U.S. patent application Ser. No. 17/518,644 filed Nov. 4, 2021 and titled DEVICE, SYSTEM, AND METHOD FOR ASSESSING WORKER RISK; U.S. Pub. No. 2021/0264764 filed May 6, 2021 and titled DEVICE, SYSTEM, AND METHOD FOR HEALTH AND SAFETY MONITORING; U.S. Pat. No. 11,030,875, filed on Nov. 20, 2019 and titled SAFETY DEVICE, SYS- TEM, AND METHOD OF USE; U.S. Pat. No. 10,522,024 filed on Sep. 7, 2018 and titled SAFETY DEVICE, SYSTEM, AND METHOD OF USE; and U.S. Pat. No. 10,096,230 filed on Jun. 6, 2017 and titled SAFETY DEVICE, SYSTEM, AND METHOD OF USE, each of which is hereby incorporated by reference herein in its entirety, including any figures, tables, or drawings or other information.

However, the embodiments are not so limited. Rather, it is contemplated that wearable devices 12 may be implemented using various other devices and/or arrangements configured to acquire sensor data and communicate recorded sensor data to monitoring system 14. In the arrangement shown, as one example, wearable devices 12 each include one or more sensors 22, an electronic circuit 24, and a power source 26 among other components.

Sensors 22:

Sensors 22 are formed of any suitable size, shape, and design and are configured to record data relating to worker 16 position, activity, and/or health and safety risks encountered by workers 16 while working. In one or more arrangements, wearable device 12 includes a plurality of sensors 22.

In one or more arrangements, wearable device 12 includes an accelerometer 22A (not shown). Accelerometer 22A is formed of any suitable size, shape, and design and is configured to detect acceleration and/or movement of the wearable device 12, such as when a worker 16 trips on something on the floor and almost falls, or when a worker 16 falls off of a ladder, is hit by a fork truck, or has another traumatic event. Accelerometer 22A may be formed of any acceleration detecting device such as a one axis accelerometer, a two-axis accelerometer, a three axis accelerometer or the like. Accelerometer 22A also allows for the detection of changes in acceleration, detection of changes in direction as well as elevated levels of acceleration.

In an alternative arrangement, or in addition to an accelerometer 22A, a gyroscope or gyro-sensor may be used to provide acceleration and/or movement information. Any form of a gyro is hereby contemplated for use, however, in one or more arrangements a three-axis MEMS-based gyroscope, such as that used in many portable electronic devices such as tablets, smartphones, and smartwatches are contemplated for use. These devices provide 3-axis acceleration sensing ability for X, Y, and Z movement, and gyroscopes for measuring the extent and rate of rotation in space (roll, pitch, and yaw).

In another arrangement, and/or in addition to an accelerometer 22A, a magnetometer may be used to provide acceleration and/or movement information. Any form of a magnetometer that senses information based on magnetic fields is hereby contemplated for use. In one or more arrangements, a magnetometer is used to provide absolute angular measurements relative to the Earth's magnetic field. In one or more arrangements, an accelerometer, gyro and/or magnetometer are incorporated into a single component or a group of components that work in corresponding relation to one another to provide up to nine axes of sensing in a single integrated circuit providing inexpensive and widely available motion sensing.

In one or more arrangements, wearable device 12 includes a temperature sensor 22B (not shown). Temperature sensor 22B is formed of any suitable size, shape, and design and is configured to detect the temperature of the environment surrounding the worker 16. The same and/or an additional temperature sensor 22B may be configured to detect the temperature of the worker 16 themselves. In one or more arrangements, temperature sensor 22B is a thermometer. Temperature sensor 22B allows for the detection of high or low temperatures as well as abrupt changes in temperature. Temperature sensor 22B also allows for the detection of when a temperature threshold is approached or exceeded.

In one or more arrangements, wearable device 12 includes a humidity sensor 22C (not shown). Humidity sensor 22C is formed of any suitable size, shape, and design and is configured to detect the humidity of the environment surrounding the worker 16. The same and/or an additional humidity sensor 22C may be configured to detect the humidity level, moisture level or perspiration level of the worker 16 themselves. Humidity sensor 22C allows for the detection of high or low levels of humidity as well as abrupt changes in humidity. Humidity sensor 22C also allows for the detection of when a humidity threshold is approached or exceeded. In one or more arrangements, wearable device 12 includes a light sensor 22D (not shown). Light sensor 22D is formed of any suitable size, shape, and design and is configured to detect the light levels of the environment surrounding the worker 16. Light sensor 22D allows for the detection of high or low levels of light as well as abrupt changes in light levels. Light sensor 22D also allows for the detection of when a light threshold is approached or exceeded. In one or more arrangements, light sensor 22D is operably connected to and/or accessible by a light pipe (not shown). A light pipe is any device that facilitates the collection and transmission of light from the environment surrounding the worker 16. In one or more arrangements, the light pipe is a clear, transparent, or translucent material that extends from the exterior of the wearable device 12 to the light sensor 22D and therefore covers and protects light sensor 22D while enabling the sensing of light conditions.

In one or more arrangements, wearable device 12 includes an air quality sensor 22E (not shown). Air quality sensor 22E is formed of any suitable size, shape, and design and is configured to detect the air quality of the environment surrounding the worker 16, the particulate matter in the air of the environment surrounding the worker 16, the contaminant levels in the air of the environment surrounding the worker 16, or any particular contaminant level in the air surrounding the worker 16 (such as ammonia, chlorine, or any other chemical, compound or contaminant). Air quality sensor 22E allows for the detection of high contaminant levels in the air as well as abrupt changes in air quality. Air quality sensor 22E also allows for the detection of when an air quality threshold is approached or exceeded.

In one or more arrangements, air quality sensor 22E is a total volatile organic compound sensor, also known as a TVOC sensor. Volatile organic compounds (or VOCs) are organic chemicals that have a high vapor pressure at ordinary room temperature. VOCs are numerous, varied, and ubiquitous. They include both human-made and naturally occurring chemical compounds. Most scents or odors are of VOCs. In this arrangement, air quality sensor 22 is configured to detect VOCs. Also, in one or more arrangements, air quality sensor 22E is accessible through one or more openings in wearable device 12 that provide unfettered access and airflow for sensing by air quality sensor 22E.

In one or more arrangements, wearable device 12 includes a carbon monoxide (CO) sensor 22F (not shown). CO sensor 22F is formed of any suitable size, shape, and design and is configured to detect CO levels of the environment surrounding the worker 16. CO sensor 22F allows for the detection of high CO levels in the air as well as abrupt changes in CO levels. CO sensor 22F also allows for the detection of when a CO threshold is approached or exceeded. Of course, sensor 22F, or additional sensors 22, may be used to sense other gasses in the air around the worker 16, such as carbon dioxide, ozone, or any other gas or other content of the air around the worker 16. Also, in one or more arrangements, sensor 22F is accessible through one or more openings in wearable device 12 that provide unfettered access and airflow for sensing by sensor 22F.

In one or more arrangements, wearable device 12 includes a position sensor 22G (not shown). Position sensor 22G is formed of any suitable size, shape, and design and is configured to detect the position of the worker 16 within the shipping facility. Notably, the term shipping facility is to be construed in a broad manner and may include being within one or a plurality of buildings. However, the shipping facility may include being outside and unconstrained by the boundaries of a building or any particular grounds. Position sensor 22G allows for the detection of movement of the worker 16 within the shipping facility, the speed of movement of the worker 16 within the shipping facility, the tracking of the position of the worker 16 within the shipping facility, among any other speed, location, direction, inertia, acceleration or position information. This position information can be aggregated over the course of the worker's shift to determine the amount of distance traveled by the worker 16, the average speed, the mean speed, the highest speed, or any other information. In addition, this position information can be aggregated to determine the areas where the worker 16 concentrated their time. In addition, this position information can be correlated with the information detected by the other sensors to determine the concentration of certain environmental factors in different areas of the shipping facility. Position sensor 22G may be a GPS device, a wireless device (e.g., Wi-Fi and/or RFID) configured to detect presence of nearby wearable devices, a wireless device that utilizes trilateration from known points, or any other device that detects the position of wearable device 12 and the worker 16.

Wearable device 12 may also include any other sensors 22. For example, in one or more arrangements, wearable device 12 includes one or more sensor 22 that tracks biometric data of the worker 16 including but not limited to, for example, heart rate, blood pressure, blood oxygen levels, blood alcohol levels, blood glucose sensor, respiratory rate, galvanic skin response, bioelectrical impedance, brain waves, and/or combinations thereof.

In one or more arrangements, wearable device 12 includes a sound sensor 22H (not shown). Sound sensor 22H is formed of any suitable size, shape, and design and is configured to detect the volume level and/or frequency of sound surrounding the worker 16. In one or more arrangements, sound sensor 22H is a microphone that is accessible through one or more openings in wearable device 12 that provide unfettered access for the sound to reach the microphone. Sound sensor 22H allows for the detection of elevated sounds, abrupt spikes in sounds, loud noises, irritating or distracting frequencies or the like. Sound sensor 22H also allows for the detection of when a volume threshold is approached or exceeded.

During operation, sensors 22 detect environmental conditions, such as sound, temperature, humidity, light, air quality, CO levels, TVOC levels, particulate levels, position and acceleration information, direction information, speed information and the like respectively. Although some arrangements may describe wearable devices 12 as including sensors 22, the arrangements are not so limited. Rather, it is contemplated that in some arrangements, sensors 22 may be omitted from wearable devices 12. For example, in some arrangements, wearable devices 12 may be configured to facilitate presence detection of workers 16 without use of sensors 22.

Electronic Circuit 24:

Electronic circuit 24 is formed of any suitable size, shape, design, technology, and in any arrangement and is configured to facilitate retrieval, processing, and/or communication of data from sensor(s) 22 of wearable device 12 to monitoring system 14. In the arrangement shown, as one example, electronic circuit 24 includes a communication circuit 32, a processing circuit 34, and a memory 36 having software code 38 or instructions that facilitates the operation of wearable device 12.

In one or more arrangements, electronic circuit 24 includes a communication circuit 32. Communication circuit 32 is formed of any suitable size, shape, design, technology, and in any arrangement and is configured to facilitate communication with monitoring system 14. In one or more arrangements, as one example, communication circuit 32 includes a transmitter (for one-way communication) or transceiver (for two-way communication). In some various arrangements, communication circuit 32 may be configured to communicate with monitoring system 14 and/or various components of system 10 using various wired and/or wireless communication technologies and protocols over various networks and/or mediums including but not limited to, for example, IsoBUS, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, Ultra Wideband (UWB), 802.15.4/ZigBee, ZWave, GSM/EDGE, UMTS/HSPA+/HSDPA, CDMA, LTE, 4G, 5G, FM/VHF/UHF networks, and/or any other communication protocol, technology or network.

In some various arrangements, electronic circuit 24 and/or communication circuit 32 may be configured to communicate data from sensors 22 to monitoring system 14 (or other device) continuously, periodically, according to a schedule, when prompted by monitoring system 14 (or other device), when wearable device is checked in and connected to charging base 18, and/or in response to any other stimuli, command, or event.

Processing circuit 34 may be any computing device that receives and processes information and outputs commands, for example, according to software code 38 stored in memory 36. For instance, in some various arrangements, processing circuit 34 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 36. Memory 36 may be any form of information storage such as flash memory, ram memory, dram memory, a hard drive, or any other form of memory.

In one or more arrangements, processing circuit 34 and memory 36 may be formed of a single combined unit. Alternatively, processing circuit 34 and memory 36 may be formed of separate but electrically connected components. Alternatively, processing circuit 34 and memory 36 may each be formed of multiple separate but communicatively connected components. Software code 38 is any form of instructions or rules that direct how processing circuit 34 is to receive, interpret and respond to information to operate as described herein. Software code 38 or instructions are stored in memory 36 and accessible to processing circuit 34.

Power Source 26:

In the arrangement shown, as one example, wearable device 12 includes a power source 26. Power source 26 is formed of any suitable size, shape, design, technology, and in any arrangement or configuration and is configured to provide power to wearable device 12 so as to facilitate the operation of the electronic circuit 24, sensors 22, and/or other electrical components of the wearable device 12. In the arrangement shown, as one example, power source 26 is formed of one or more batteries, which may or may not be rechargeable. Additionally or alternatively, in one or more arrangements, power source 26 may include a solar cell or solar panel that may power or recharge wearable device 12. Additionally or alternatively, in one or more arrangements, power source 26 may be line-power that is power that is delivered from an external power source into the wearable device 12 through a wired connection. Additionally or alternatively, in one or more arrangements, power source 26 may be a wireless power delivery system configured to power or recharge wearable device 12. Any other form of a power source 26 is hereby contemplated for use.

Attachment Member 28:

In one or more arrangements, wearable device 12 is configured to be worn by a worker 16 and in this way, wearable device 12 is considered to be a wearable device 12. To facilitate being worn by a worker 16 while working, wearable device 12 includes an attachment member 28 connected to or formed into wearable device 12. In some various arrangements, wearable device 12 may utilize various different methods and/or means to attach with a worker 16 including but not limited to, for example, a band, strap, belt, elastic strap or the like, that is attachable to a worker's arm wrist, waist or other part of the body or clothing worn by the worker 16. In one or more arrangements, it is desirable to attach the wearable device 12 to the worker's non-dominant arm while working. Alternatively, attachment member 28 is formed of any other device that connects two components together such as a snap-fit member, a clip, hook-and-loop arrangement, a button, a snap, a zipper-mechanism, a zip-tie member, or the like, just to name a few. As another arrangement, wearable device 12 can be attached to or formed as part of a piece of clothing or equipment, such as a safety vest, a helmet or the like. In one or more arrangements, as is further described herein, wearable device 12 is held within a holster having an attachment member 28 in a removable manner, as is further described herein.

Wearable Devices 12 in Operation:

In some arrangements, electronic circuit 24 is configured to retrieve and evaluate data from sensors 22 to identify events of interest to facilitate selection of sensor data for analysis by monitoring system 14 and/or trigger performance of one or more actions. For example, in one or more arrangements, electronic circuit 24 of wearable device 12 is configured to capture data from by sensors 22 and periodically communicate the data or data metrics derived therefrom to monitoring system 14. In some various arrangements, such communication of data may be performed, for example, every second, ten seconds, thirty seconds, minute, 5 minutes, or any other suitable duration of time. In some various arrangements, such communication may communicate sensor measurements and/or data metrics from a single point in time, or measurements and/or data metrics collected over a certain window of time.

Additionally or alternatively, in one or more arrangements electronic circuit 24 of wearable device 12 is configured to communicate data captured by sensors 22 in response to the data satisfying a set of criteria. For example, in one or more arrangements, electronic circuit 24 of wearable device 12 is configured to continuously monitor data captured by sensors 22 of wearable device 12 of a worker 16 during a work shift and evaluate the data to identify instances in which the data indicates an event of interest (e.g., motion data indicating acceleration/deceleration exceeding a threshold). In response to identifying an event of interest, a segment (or window) of the sensor data in which the event occurred is communicated to the monitoring system for evaluation. Said another way, in some arrangements wearable device 12 pre-evaluates sensor data so as to only communicate sensor data when events of interest occur. Pre-evaluation of sensor data by the wearable device 12 provides several benefits. Power usage by wearable device 12 for communication of data is reduced as less data is required to be transmitted to monitoring system 14. Furthermore, because less data is transmitted by wearable devices 12 more bandwidth is available for communication data and interference and collisions are reduced. Pre-evaluation of sensor data by the wearable device 12 also reduces processing and storage requirements of monitoring system 14.

It is noted that in some arrangements, wearable devices 12 need not communicate a separate window of sensor data for every sample that satisfies criteria for an event of interest. For example, in one or more arrangements, wearable devices 12 may be configured to disable communication of data windows for the same events of interest for a period of after communicating a first window of sensor data for a detected event of interest (e.g., for 1 minute). However, the embodiments are not so limited. Rather, it is contemplated that wearable devices 12 may be configured to disable communication of data windows for any other length of time after communicating a first window of sensor data for a detected event of interest.

In one or more arrangements, data is communicated by wearable devices 12 to monitoring system 14 as events of interest are identified. However, the embodiments are not so limited. Rather, it is contemplated that in one or more arrangements, wearable devices 12 may store windows of sensor data corresponding to identified events of interest for later communication to monitoring system 14. For example, in one or more arrangements, wearable devices 12 may store a window of sensor data for later communication to monitoring system 14 if an attempt to wirelessly communicate the window of sensor data is unsuccessful.

Although some arrangements are primarily described with reference to identifying events of interest in motion data, the embodiments are not so limited. Rather, it is contemplated that in some arrangements wearable devices 12 may additionally or alternatively identify events of interest based on data of other sensors and/or data metrics derived therefrom and/or using various different criteria and/or algorithms. In one or more arrangements, wearable devices 12 are configured to perform analytics on sensor data directly on the wearable devices 12 to identify events of interest, generate data metrics, and/or trigger performance of various actions by wearable devices 12. In some various arrangements, actions may include but are not limited to, providing status messages, alerts, or other notification (e.g., emails, SMS, push notifications, automated phone call, social media messaging, and/or any other type of messaging) to a safety manager or other users and/or devices (e.g., computer, table, or smartphone).

In one or more arrangements, wearable devices 12 are configured to perform various preprogrammed actions in response to analytics of sensor data and/or derived data metrics satisfying one or more trigger conditions (e.g., detecting certain events of interest). In one or more arrangements, wearable devices 12 include a configuration data file in memory 36 that specifies one or more trigger condition and one or more actions to be performed when respective trigger conditions are satisfied. The configuration data file may be any form of information that indicates conditions in which wearable device 12 is to perform actions and which actions are to be performed. In one or more arrangements, configuration data file is arranged as a set of rules, where each rule indicates a set of conditions and one or more actions to be performed when the conditions are satisfied. However, it is contemplated that wearable devices 12 may be configured to utilize a configuration data file with any configuration, arrangement, format, or structure, Charging Base 18

In one or more arrangements, system 10 includes a charging base 18. Charging base 18 is formed of any suitable size, shape, and design and is configured to receive, charge and transfer information from and to wearable devices 12. In the arrangement shown, as one example, charging base 18 includes a back wall 42 that includes a plurality of sockets 44 therein that are sized and shaped to receive wearable devices 12 therein. When wearable devices 12 are placed within sockets 44, wearable devices 12 are charged by charging base 18 and data may be transferred between wearable device 12 and charging base 18 and the other components of the system 10. Charging base 18 also includes a user interface 46 configured to provide the ability for the workers 16 to interact with the charging base 18. User interface 46 may include but is not limited to, for example, a plurality of sensors, a keypad, a biometric scanner, a touch screen or any other means or method input for information.

In one or more arrangements, charging base 18 is configured to facilitate checkout/check-in of wearable devices 12 by workers 16. As one example, at the beginning of a shift, a worker 16 engages the charging base 18 using user interface to identify the worker with the system 10 (e.g., by biometrically scanning in with a finger or thumb print, a retinal scan, facial recognition, voice recognition, inputting a name or identifier, swiping an ID card, and/or any other manner or method of associating their personal identification with the system 10).

Upon receiving this information, charging base 18 and system 10 identifies the worker 16 and allocates a wearable device 12 held within one of the sockets 44 of the charging base 18 that is fully charged, or has the highest charge among the wearable devices 12, and assigns that wearable device 12 to that worker 16 by illuminating the wearable device 12, illuminating the socket 44 that the wearable device 12 is held in, or providing the socket number to the worker 16 or by identifying which wearable device 12 the worker 16 is to take by any other manner, method or means. Once the proper wearable device 12 has been identified to the worker 16, the worker 16 retrieves that wearable device 12 from the charging base 18 and puts on the wearable device 12.

During the work shift, the wearable device 12 gathers data from sensors 22 and communicates data and/or voice recordings to monitoring system 14 as described herein. At the end of the shift, the worker 16 returns the wearable device 12 to the charging base 18. Once the wearable device 12 is plugged into a socket 44, the charging base 18 begins charging the wearable device 12. If the wearable device 12 has buffered data, charging base 18 retrieves the data from the wearable device 12 and provides the retrieved data to monitoring system 14.

In one or more arrangements, after turning in the wearable device 12 at the end of their shift, the worker 16 is provided with a log of all instances that were identified as events of interest. The information related to each of these potential accidents or near misses and/or notable events is provided to the worker 16 such as time, acceleration, position, temperature, light level, air quality, volume, CO level, the audible recording or converted text of the contemporaneous recording of the incident or notable event. The worker 16 is then provided the opportunity to confirm or deny whether a notable event trigger actually occurred and provide additional information regarding the notable event trigger. This provides the worker 16 the opportunity to clarify the record and provide additional information.

In one or more arrangements, the system 10 may also update the software or firmware on the wearable device 12 and prepare the wearable device 12 for another use while in the charging base. For example, in one or more arrangements, system 10 may from time to time update classifiers or other analytics algorithms used by wearable devices 12 to identify events of interest.

Monitoring System 14

Monitoring system 14 is formed of any suitable size, shape, design and is configured to receive and process sensor data from wearable devices 12 to facilitate analysis of sensor data (e.g., to assess worker physicality, risk, and/or derive various other data metrics). In the arrangement shown, as one example, monitoring system 14 includes a database 60 (optional) and a data processing system 62, among other components.

Database 60:

Database 60 is formed of any suitable size, shape, design and is configured to facilitate storage and retrieval of data. In the arrangement shown, as one example, database 60 is local data storage connected to data processing system 62 (e.g., via a data bus or electronic network 20). However, the embodiments are not so limited. Rather, it is contemplated that in one or more arrangements database 60 may be remote storage or cloud based service communicatively connected to data processing system 62 via one or more external communication networks.

In some various arrangements, information recorded by wearable devices 12 may be communicated to database 60 for storage directly (e.g., over electronic network 20) from wearable devices. Additionally or alternatively, in some various arrangements, information recorded by wearable devices 12 may be communicated to database 60 for storage indirectly (e.g., by charging base 18 and/or data processing system 62).

Data Processing System 62:

Data processing system 62 is formed of any suitable size, shape, and design and is configured to facilitate receipt, storage, and/or retrieval of information in database 60, execution of analytics processes 70, providing of a user interface 72, and/or implementation of various other modules, processes or software of system 10. In one or more arrangements, for example, such data processing system 62 includes a circuit specifically configured and arranged to carry out one or more of these or related operations/activities. For example, data processing system 62 may include discrete logic circuits or programmable logic circuits configured and arranged for implementing these operations/activities, as shown in the figures, and/or described in the specification. In certain embodiments, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of instructions (and/or configuration data). The instructions (and/or configuration data) can be in the form of firmware or software stored in and accessible from a memory (circuit). Certain embodiments are directed to a computer program product (e.g., nonvolatile memory device), which includes a machine or computer-readable medium having stored thereon instructions, which may be executed by a computer (or other electronic device) to perform these operations/activities.

User Interface 72:

User interface 72 is formed of any suitable size, shape, design, technology, and in any arrangement and is configured to facilitate user control and/or adjustment of various components of system 10. In one or more arrangements, as one example, user interface 72 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface 72 includes a display (not shown). Such display is formed of any suitable size, shape, design, technology, and in any arrangement and is configured to display information of settings, sensor readings, time elapsed, and/or other information pertaining to worker activity and/or health and safety risks; operation of system 10; and/or management of workers 16. In one or more arrangements, the display may include, for example, LED lights, meters, gauges, screen or monitor of a computing device, tablet, and/or smartphone.

Additionally, or alternatively, in one or more arrangements, the inputs and/or display may be implemented on a separate device that is communicatively connected to monitoring system 14. For example, in one or more arrangements, operation of monitoring system 14 may be customized or controlled using a smartphone or other computing device that is communicatively connected to the monitoring system 14 (e.g., via Bluetooth, WiFi, and/or the internet).

Analytics Processes 70

In some example arrangements, data processing system 62 is configured to perform various tracking, analytics processes 70, and/or other operations described using data received from wearable devices 12 and/or data stored in database 60.

Physicality Assessment:

In one or more arrangements, analytics processes 70 are configured to analyze data provided by sensors 22 to assess the physical exertion of workers 16. Jobs requiring high levels of physical exertion may be more likely to result in injury or require more frequent rotation between assigned jobs. In this example arrangement, analytics processes 70 are configured to quantify the total physicality of tasks performed by workers 16 based on heart rate, temperature, perspiration level, number of steps, distance traveled, accelerometer data, and/or other data acquired by sensors 22 or determined by analytics processes 70 using data analytics (e.g., the determined repetitive motion quantification). In some various arrangements, the analytics processes 70 may generate and store data metrics indicating instances in which a worker 16 exhibits high levels of physical exertion during a work shift. Such data metrics may be useful in assessing safety risk faced by a worker 16 during a work shift, assessing worker 16 productivity, and/or determining work schedules.

Identifying High Risk Events:

In one or more arrangements, analytics processes 70 are configured to process information received from wearable devices 12 and/or data stored in database 60 to derive additional data metrics pertinent to assessment of safety risk of workers 16. In an example arrangement, analytics processes 70 may be configured to evaluate the data using a classifier, state machine, and/or other machine learning algorithm that is trained to identify high risk events (e.g., accidents, trips/falls, near misses, and/or other events indicative of injury or heightened safety risk) that are not directly identified and reported by wearable devices 12. In some arrangements, identified instances may be logged to create a history of high risk events for a worker 16. Such historical data may be useful in assessing safety risks faced by a worker 16 during a work shift.

Motion Identification and Assessment:

In yet another example arrangement, analytics processes 70 are configured to analyze data of an accelerometer sensor 22 to identify motions which may lead to injury over time. Identification of motions may be helpful to identify performance of tasks that have a higher risk of injury. Identification of such tasks may be useful in assessing safety risks faced by a worker 16 during a work shift. In one or more arrangements, analytics processes 70 may be configured to identify any number of different motions including but not limited to, for example, bending at waist, twisting, overhead reach, walking, slips, trips, falls, and/or repetitive motions.

Identification of repetitive motions may be helpful to facilitate development and execution of measures to avoid such injury. In this example arrangement, analytics processes 70 may be configured to regularly retrieve accelerometer sensor 22 data of workers 16 from database 60 for evaluation (e.g., daily, weekly, or monthly). After retrieving the data, analytics processes 70 processes the data using, for example a classifier, state machine or other machine learning algorithm that is trained to detect and group similar motion events.

In an example arrangement, after processing the data to identify similar motion events, analytics processes 70 determines a set of workers 16 in which a motion or similar group of motions is identified with a high number of occurrences (e.g., exceeding a specified threshold). In this example arrangement, analytics processes 70 then flag the task performed by the workers 16 as a high risk activity.

In one or more arrangements, analytics processes 70 are configured to quantify the level of repetitive motions performed by a worker 16. For example, in one or more arrangements, analytics processes 70 may be configured to quantify repetitive motions based on the number of instances that a worker 16 performs the identified repetitive motions in a certain period of time (e.g., day, week, month). In some various arrangements, the analytics processes 70 may generate reports, e.g., tables, charts, graphs, maps, showing the quantified repetitive motion, for example, for different jobs, workplace areas, different departments, groups and/or individual workers, and/or different shifts or times of day.

Deviation From Similar Workers

In one or more arrangements, analytics processes 70 are configured to identify workers 16 for which recorded information and/or data metrics deviates from that of other similarly situated workers. Such identification of workers 16 may be useful for example to identify workers 16 whose safety risk may be atypical and not accurately represented by the average risk for the worker's occupational role. In one or more arrangements, analytics processes 70 may generate a report indicating workers 16 for which deviations have been identified. In some arrangements, the analytics processes 70 may send the report to a manager for review. In some arrangements, in response to identifying deviations for a set of workers 16, monitoring system 14 may be configured to automatically perform various additional analytics processes 70 to generate data metrics indicative of safety risk faced by the workers 16.

Trend Analysis:

It is recognized that workers 16 tend to experience increased risk over time, often due to changes in their work environment and/or long hours in difficult conditions. As an illustrative example, a worker 16 may begin to regularly work in low lighting at the end of a long shift. Such low lighting may present risk of fatigue and increase risk of injury. In one or more arrangements, analytics processes 70 are configured to track values of the worker data stored in database 60 to identify when trends occur. In one example arrangement, in response to identifying a trend in the data, analytics processes 70 update data metrics and/or risk assessments for the worker 16. Additionally or alternatively, in response to identifying a trend in the data, analytics processes 70.

Machine Learning:

In one or more embodiments, data processing system 62 and/or other components of system 10 may be configured and arranged to monitor, learn, and modify one or more features, functions, and/or operations of the system. For instance, analytics processes 70 of data processing system 62 may be configured to monitor and/or analyze data stored in database 60 and/or operation of system 10. As one example, in one or more arrangements, data processing system 62 may be configured to analyze the data and learn, over time, data metrics indicative of safety risks and/or algorithms for identification of safety risks. Such learning may include, for example, generation and refinement of classifiers and/or state machines configured to map input data values to outcomes of interest or to operations to be performed by the system 10. In various embodiments, analysis by the data processing system 62 may include various guided and/or unguided artificial intelligence and/or machine learning techniques including, but not limited to: neural networks, genetic algorithms, support vector machines, k-means, kernel regression, discriminant analysis and/or various combinations thereof. In different implementations, analysis may be performed locally, remotely, or a combination thereof.

In one or more arrangements, analytics processes 70 are configured to utilize physicality ratings data of workers 16 to select data for training of classifiers (or other machine learning algorithms). Such selection of data may be used, for example, to facilitate unsupervised training of machine learning algorithms. For example, data of workers 16 having high physicality ratings may be used to train machine learning algorithms to identify high physicality, safety risks from other data metrics, sensor data, and/or evaluation criteria.

Management Software 74

In one or more arrangements, information provided by wearable devices 12 is processed by management software 74. In one or more arrangements, management software 74 converts the information into an incident report and a signal, such as a text message, email, or the like is transmitted to an electronic device (such as a cell phone, a handheld device, their own wearable device 12, an email account, or any other electronic device capable of receiving an electronic message or information) of one or more safety managers or other managers or other persons in charge of managing safety in the manufacturing facility. This signal includes the position/location of the event, time of the event, name of the worker 16 involved and type of potential accident or near miss along with any other pertinent information. In one or more arrangements, the audible recording of the worker's description of the accident or near miss is also transmitted, or this audible recitation is automatically converted to text which is transmitted in text form as part of this signal. With this timely information, the safety manager can quickly and effectively respond to the potential accident or near miss. This information is also stored as an incident report in database 60 for risk assessment, data mining, data retrieval, data analytics, and/or machine learning and artificial intelligence purposes.

As this event is a safety event, transmission is expedited through the system 10 so that the safety manager, a response team or others can quickly respond in an attempt to mitigate the injury or damage. In one or more arrangements, when this signal indicating a safety event occurred is received, the location of the event is transmitted to a building control or safety system that then implements alarms, flashing lights or other safety precautions in the affected portion of the manufacturing facility to alert others as to the event and in an attempt to prevent further injury or damage. Once the safety manager arrives at the scene of the accident or near miss they may see that a pallet was placed in a high traffic area, as one example. In response, the safety manager can move the pallet or cordon off the area to prevent future accidents and/or take further corrective actions.

Trigger Actions Based Data Gathered by Wearable Devices 12:

In one or more arrangements, management software 74 (and/or analytic processes 70) may be configured to perform various actions in response to data provided by wearable devices satisfying certain criteria. For example, in one or more arrangements, monitoring system 14 may be configured to generate control signals and/or control various equipment/devices/systems or switching of one or more relay switches in response to data received from a wearable device 12 satisfying a particular set of criteria. For example, in one or more arrangements, management software 74 may be configured to control operation of various devices (e.g., lights, alarms, locks, doors, and/or any other devices) based on location of wearable devices 12.

Alternative Arrangement

Figure 2:
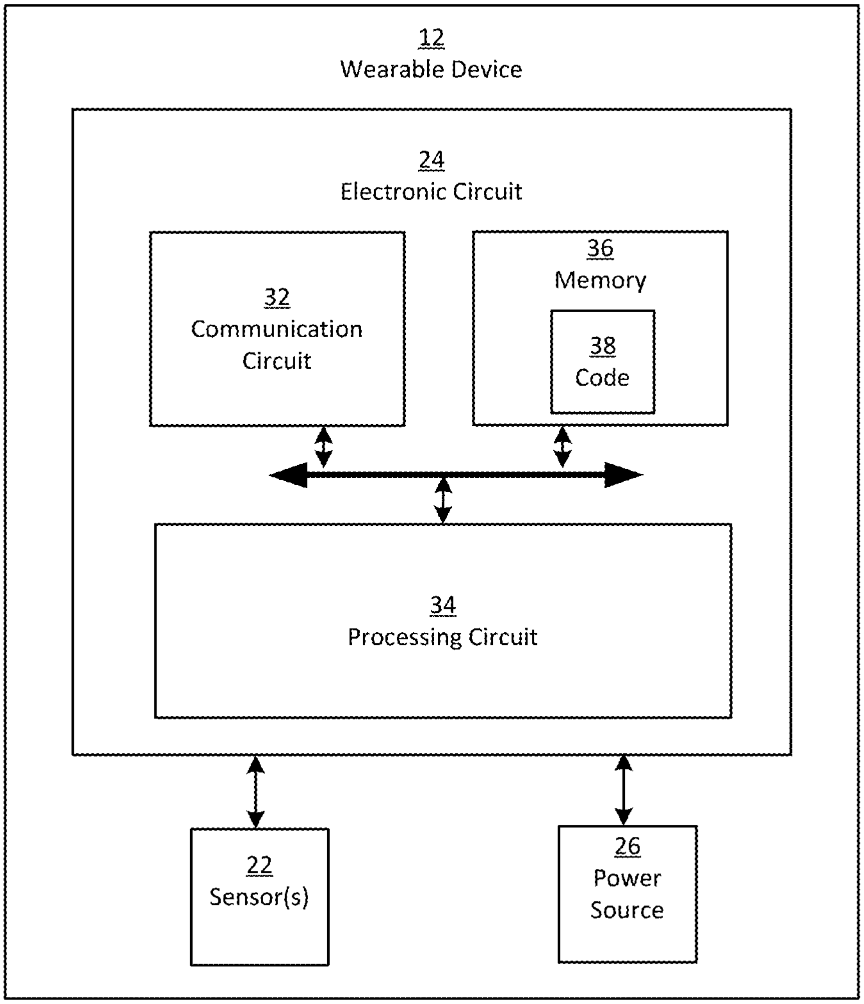
FIG. 2 shows a block diagram view of a wearable device, in accordance with one or more arrangements.
Figure 3:
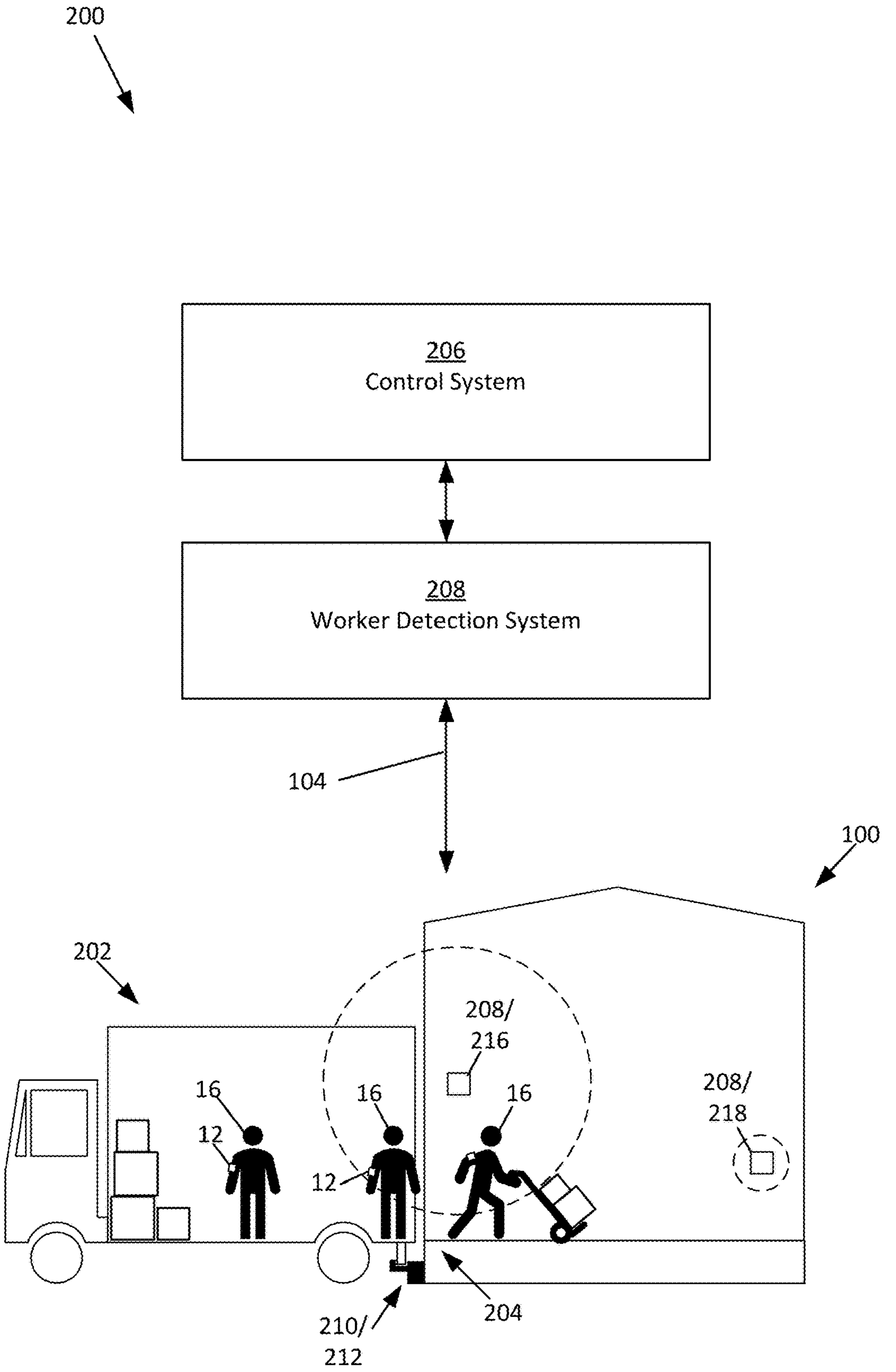
FIG. 3 shows a block diagram view of a safety system, in accordance with one or more arrangements; the view showing the safety system having a worker detection system and a control system implemented separately.
Figure 4:
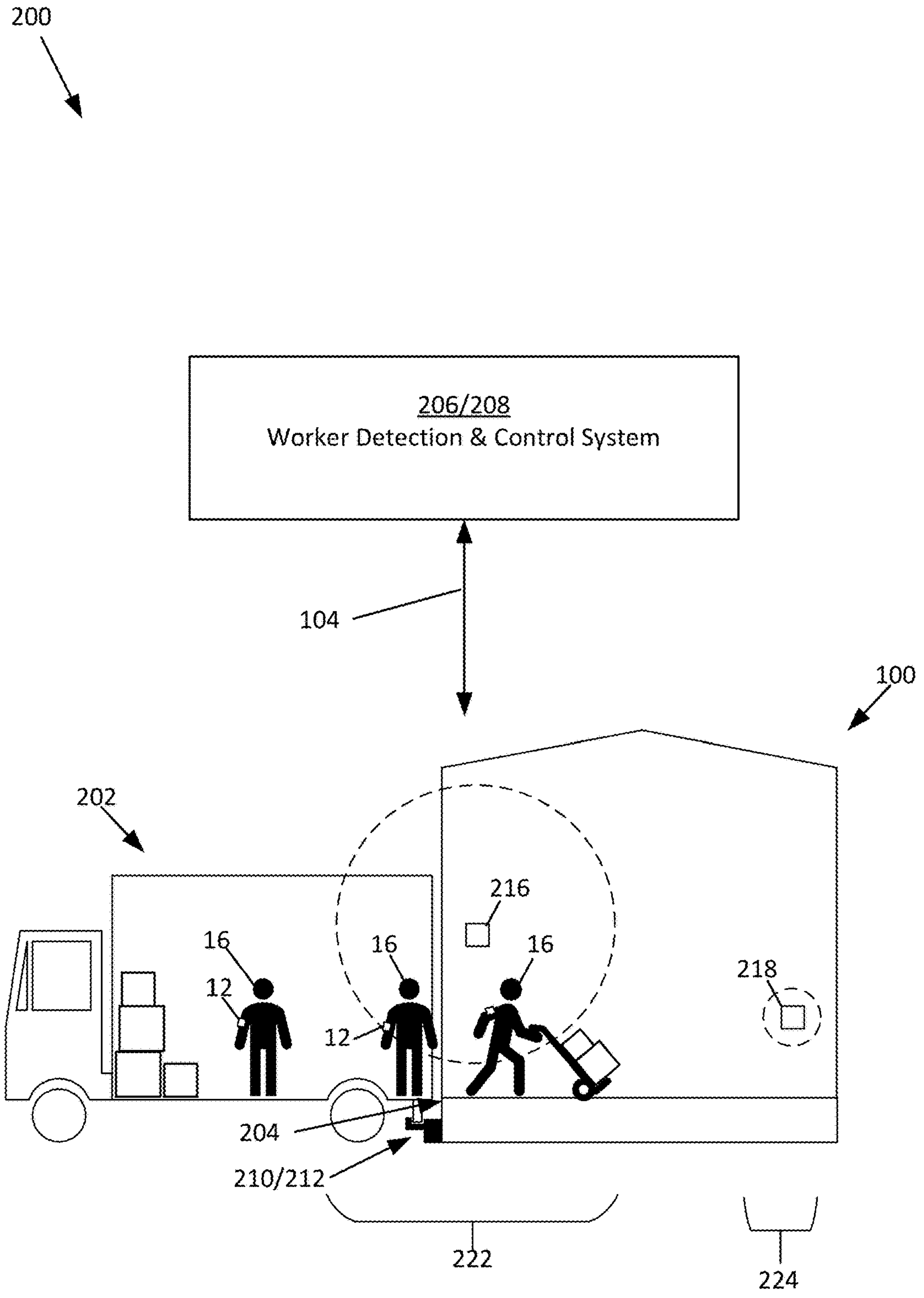
FIG. 4 shows a block diagram view of a safety system, in accordance with one or more arrangements; the view showing the safety system having a worker detection system and a control system implemented together.
Figure 5:
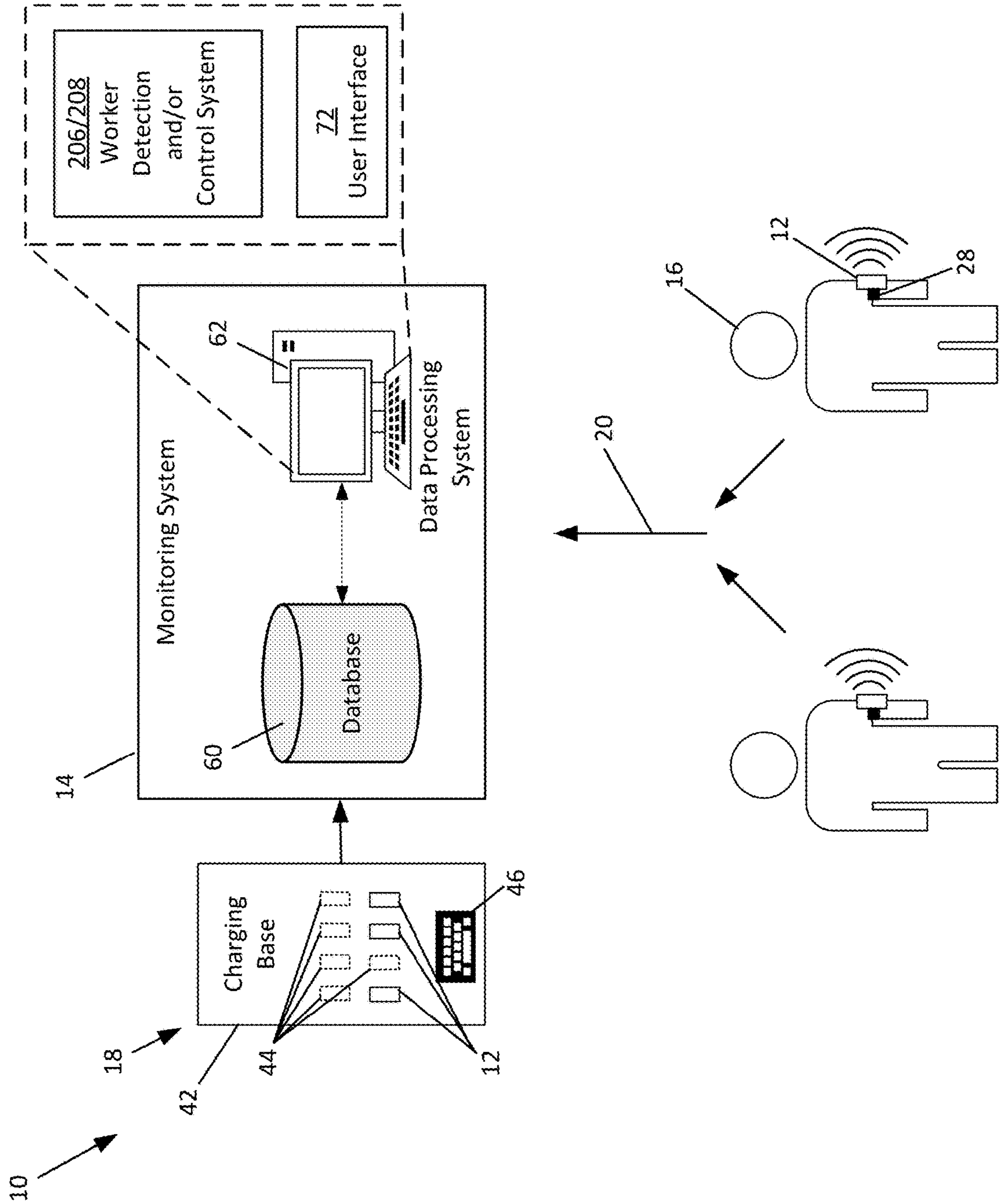
FIG. 5 shows a block diagram view of a monitoring system configured to implement a safety system, in accordance with one or more arrangements; the system utilizing wearable devices worn by workers to facilitate the monitoring of worker presence.
Figure 6:
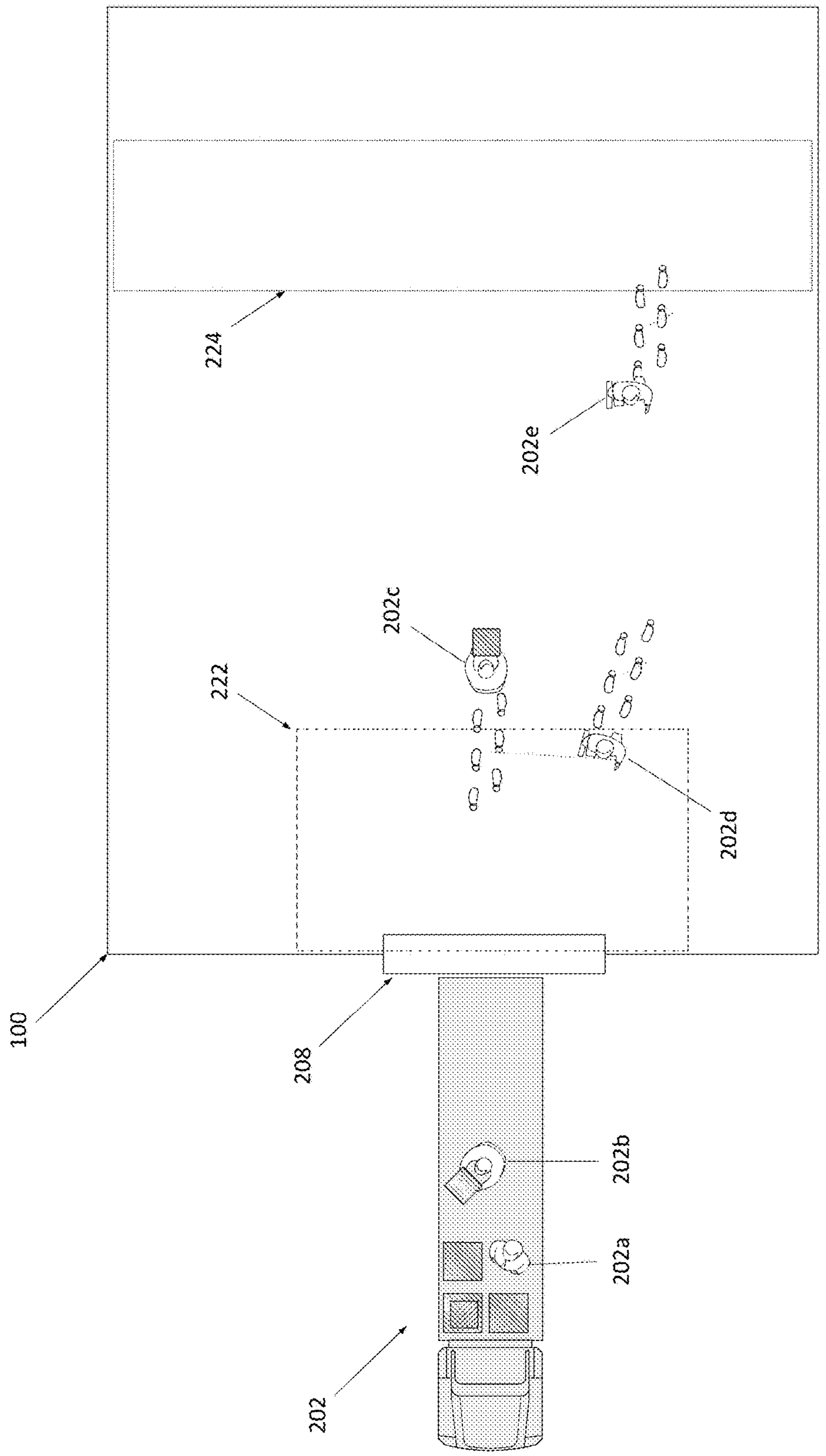
FIG. 6 shows an overhead view of a shipping truck and loading dock of a shipping facility having a safety system, in accordance with one or more arrangements.

With reference to FIGS. 3-11, a system and method for operating safety devices is presented. The arrangements shown in FIGS. 3-11 may include various components similar to those of the system 10 discussed with reference to FIGS. 1-2 and as such the disclosure related to the arrangements discussed with reference to FIGS. 1-2 applies to the arrangements shown in FIGS. 3-11 unless stated specifically herein.

Safety System 200

With reference to the figures, a safety system 200 (or simply system 200) is presented. In one or more arrangements, system 200 includes a plurality of wearable devices 12, a worker detection system 208 and a control system 206, and among other components. In one or more arrangements, system 200 is configured to control a safety device 210 based on presence of workers to improve safety.

Loading Dock 204 and Safety Device(s) 210

Loading dock 204 may be formed of any suitable size, shape, and design and is configured to facilitate loading and/or unloading of items to/from a truck and/or shipping container 202 at a shipping facility 100. In the arrangement shown, safety device(s) 210 are formed of any suitable size, shape, and design and are configured to restrict operation and/or movement of dangerous equipment (e.g., vehicles, loading dock doors, elevating docks, dock levelers, dock boards, dock lights, or other equipment at a loading dock 204) in presence of nearby workers 16. While some arrangements may be primarily described with reference to control of safety devices 210 at a loading dock 204 based on worker presence, the arrangements are not so limited. Rather, it is contemplated that various arrangements may be adapted for use with various different types of safety devices in various other applications.

In the arrangement shown, as one example, safety device(s) 210 includes a includes a restraint device 212 positioned proximate to loading dock 204. In this example, restraint device 212 is configured to hold a truck or shipping container 202 in place while being unloaded while locked and permit the truck or shipping container 202 to be moved when unlocked. In the arrangement shown, restraint device 212 has an actuated hook configure to move to and engage a bumper/frame of a truck 202 when locked and disengage from the bumper/frame of the truck 202 when unlocked. However, the embodiments are not so limited. Rather, it is contemplated that in some various arrangements, system 200 may be used to control various other types of systems and/or devices and/or perform various actions and/or processes.

Worker Detection System 208

Worker detection system 208 is formed of any suitable size, shape, and design and is configured to facilitate detection and/or tracking presence of workers 16 in area(s) of interest (e.g., loading dock 204). In one or more arrangements, worker detection system 208 includes a first detection device 216 configured to communicate with or otherwise detect wearable devices 12 in a first area (e.g., area 222) of shipping facility 100 proximate to a loading dock 204.

In one or more arrangements, worker detection system 208 is configured to notify control system 206 of the presence of workers 16 to facilitate disabling of dangerous equipment/hazards when workers 16 are present. However, due to interference causes by obstructions and/or noise, absence of workers in a particular area of concern (e.g., area 222) cannot be guaranteed when wearable devices are not detected. For example, walls of a truck or shipping container 202 and/or cargo may obstruct detection of workers 16 present in the truck or shipping container 202. In order to ensure safety of workers 16, safety devices 210/212 remain engaged while workers 16 are present. In one or more arrangements, worker detection system 208 includes a second detection device 218 positioned away from the area 222 of concern and out of range of the first detection device 216. For example, in one or more arrangements, control system 206 may be configured to assume a worker 16 remains present once detected by the first detection device 216 until the particular worker 16 is detected by the second detection device 218 that is positioned away from the area 222 of concern (or by another detection device positioned elsewhere in the facility). In this manner, absence of a previously detected worker 16 can be confirmed. This later approach is less susceptible to intermittent connections (e.g., caused by radio interference) and/or may extend battery life of wearable devices 12 due to the reduced communication between wearable devices 12 and worker detection system 208.

In one or more arrangements, detection devices 216 and 218 are sensors configured to detect when wearable devices 12 are within a certain proximity. That is, presence of a worker 16 is detected when a wearable device 12 for a worker 16 is within range of a detection device (e.g., 216 or 218). For example, in one or more arrangements, detection devices 216 and 218 are configured to wirelessly communicate with wearable devices 12 to facilitate communication of data from wearable devices 12 (e.g., a device/worker ID and/or sensor data recorded by wearable devices 12). When a wearable device 12 is within communication range of a detection device 216/218, presence of the wearable device 12 is detected.

In one or more arrangements, the detection device 216, located in or proximate to an area of interest (e.g., in adjacent area 222), is configured to have a wider range of detection of wearable devices than detection device 218, located away from the area of interest (e.g., in distant area 224). For example, the detection device 216 may be configured to communicate with wearable devices using a longer range communication protocol (e.g., Bluetooth) and detection device 218 is configured to communicate with wearable devices 12 using a shorter range communication protocol (e.g., NFC). This approach helps ensure that presence of workers 16 that enter area 222 is automatically detected and that the absence of such workers 16 is not determined until the workers 16 gets within closer proximity to detection device 218 (e.g., to log out of the area).

However, the arrangements are not so limited. Rather, it is contemplated that in some various arrangements, both detection devices 216 and 218 may be configured to communicate with wearable devices 12 using the same communication protocol (e.g., Bluetooth). Moreover, it is contemplated that in some various arrangements, worker detection system 208 may be configured to detect and track presence of workers 16 in a particular area using various other methods and means.

For example, in one or more arrangements, worker detection system 208 is configured to determine proximity of workers 16 to detection devices 216 and 218 and identify a worker 16 as being in the presence of the detection devices 216 and 218 when the worker 16 is within a threshold range. For instance, in one or more arrangements, worker detection system 208 is configured to determine distance of workers 16 from the detection devices 216 and 218 based on one or more properties of wireless communications between the wearable devices 12 and detection devices 216 and 218. In some various arrangement, worker detection system 208 may utilize various wireless communication properties to determine distance of wearable devices from the detection devices 216 and 218 including but not limited to, for example, signal strength, signal propagation time (e.g., round trip propagation time), and/or any other property of wireless communications that may be indicative of distance. In one or more arrangements, worker detection system 208 is configured to permit a user to adjust threshold range(s) for the detection devices 216 and 218 that are used to determine when workers 16 are considered to be present in the respective areas of the detection devices 216 and 218.

As another example, in one or more arrangements, worker detection system 208 is configured to determine presence of workers 16 using location data received from wearable devices 12. For example, in one or more arrangements, wearable devices 12 may be configured to communicate GPS (or other position data acquired from position sensor 22G) to worker detection system 208 in real time. In some various arrangements, worker detection system 208 and/or control system 206 may then use location of workers 16 to determine presence in areas of concern and control safety device 210 as may be appropriate. While worker detection system 208, is primarily shown and described with reference to detection of workers 16 using wearable devices 12, the embodiments are not so limited. Rather, it is contemplated that in one or more arrangements worker detection system 208 may detect when workers 16 are present on a loading dock 204 using various means or methods including but not limited to, for example, wearable devices 12, badges, smart cards, proximity detection, motion sensors, thermal imaging, object and/or facial recognition, geo-fencing, GPS, RF communication, and/or any other means or method for determining presence and/or location of workers 16.

In Operation:

As an illustrative example, a detection device (e.g., detection device 216) is positioned and configured with a suitable range so that wearable devices 12 of workers 16 will be detected by worker detection system 208 prior to workers 16 entering the area 222 proximate to loading dock 204. In this illustrative example, in response to detection device 216 detecting a worker 16, the worker detection system 208 communicates data to control system 206 that indicates that the worker 16 is working on the first loading dock 204. Control system 206 may then perform various operations of safety devices 210 based on the knowledge that the worker 16 has been added to a list of active workers present at the particular loading dock 204 area 222 (e.g., disable unlocking of restraint device 212 to prevent movement of a truck while workers 16 are present.

Conversely, in this illustrative example, a detection device (e.g., detection device 218) is positioned with a suitable range so that wearable devices 12 of workers 16 will be detected if the worker 16 later leaves the loading dock 204 area 222 on break or at the end of unloading and/or a work shift. For example, detection device 218 may be located at distant area 224 positioned away from the loading dock 204 (e.g., nearby an exit). In response to detection device 218 detecting worker 16, the worker detection system 208 and/or control system 206 removes the worker 16 from the list of active workers present at the particular loading dock 204. Control system 206 may then perform various operations to adjust status of workers 16 present in the area 222 proximate to loading dock 204 as may be appropriate.

In one or more arrangements, worker detection system 208 may be configured to gather and communicate various other data metrics to control system 206 addition to or in lieu of worker 16 presence. In some various arrangements, data metrics gathered by worker detection system 208 may include but are not limited to, for example, data gathered by sensors 22 of wearable devices 12, other sensors communicatively connected to worker detection system 208, and/or various data metrics derived therefrom.

In one or more arrangements, worker detection system 208 may store and/or aggregate worker 16 presence information and/or other data metrics (e.g., in database 60). Additionally or alternatively, in one or more arrangements, worker detection system 208 may simply communicate worker 16 presence information and/or other data metrics to control system 206 without storing the information and/or data metrics.

Control System 206

In one or more shown arrangements, system 200 includes a control system 206. Control system 206 is formed of any suitable size, shape, design and is configured to retrieve and/or receive information from worker detection system 208 (or other data source) relevant to operation of the shipping facility 100 and perform one or more control processes 228 to adjust operation of safety devices 210 based on the received/retrieved information.

In one or more arrangements, control system 206 and/or worker detection system 208 may be implemented as part of monitoring system 14. For example, in one or more arrangements, control system 206 and/or worker detection system 208 may be implemented as a process executed by data processing system 62 of monitoring system as part of, in addition to, and/or in lieu of analytics 70, user interface 72, and/or management software 74 processes. However, the arrangements, are not so limited. Rather, it is contemplated that in some arrangements, control system 206 and/or worker detection system 208 may be implemented separately from and communicatively connected to monitoring system 14. Moreover, in some arrangements, control system 206 and/or worker detection system 208 may be a standalone systems with monitoring system omitted entirely.

Furthermore, while the arrangements are primarily discussed with reference to a system 200 having a control system 206 connected over one or more networks 104 to worker detection system 208, the embodiments are not so limited. Rather, it is contemplated that control system 206 and worker detection system 208 may be implemented and located together as one system. Any other arrangement or distribution of system components is also contemplated.

In Operation

In some various different arrangements, control system 206 may be configured to perform various different control processes 228 to adjust operation of safety devices 210 based on information received from or generated by worker detection system(s) 208 and/or other data source.

Figure 7:
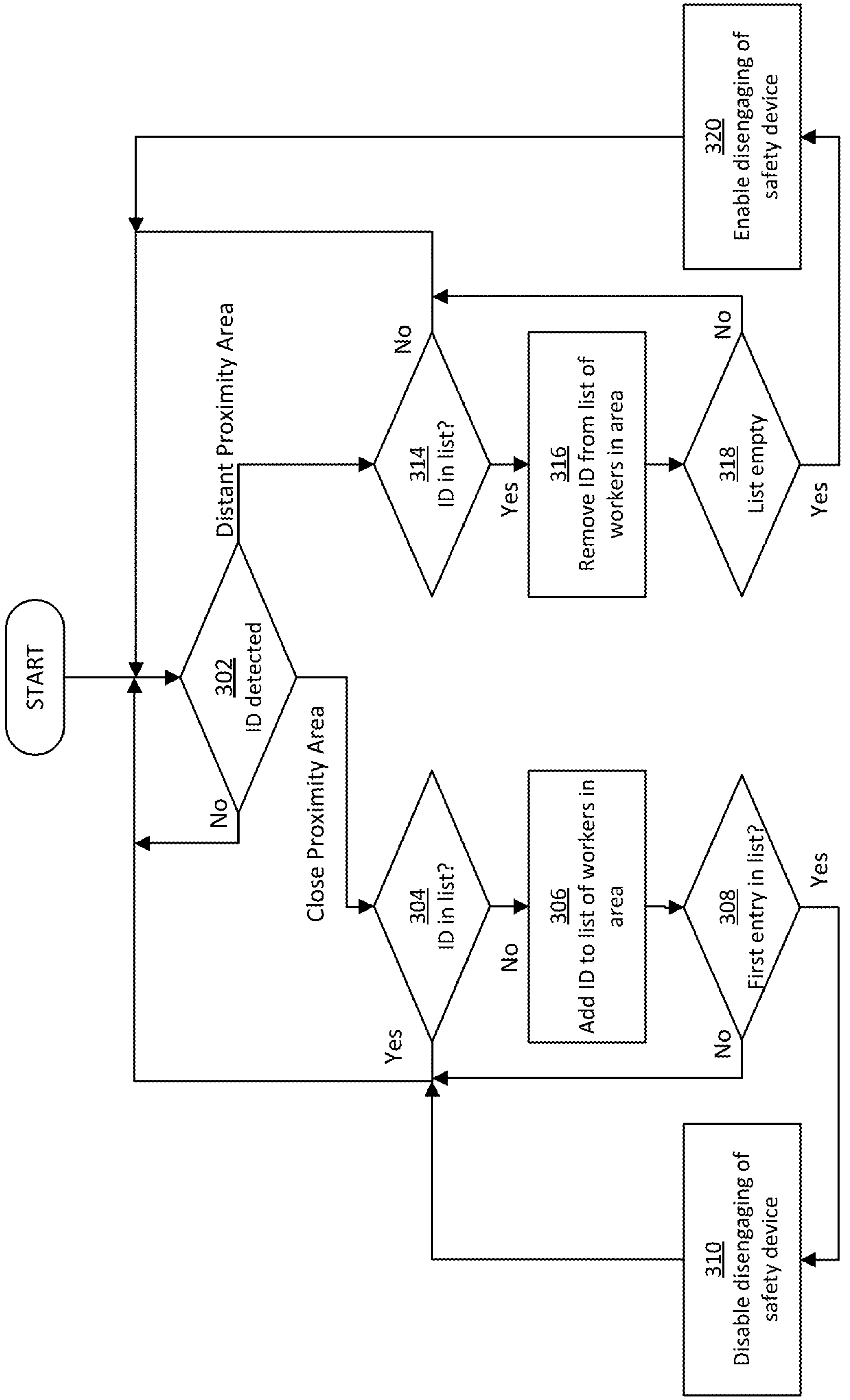
FIG. 7 shows a flowchart of an example process for control of a safety device by control system in response to detection of workers by worker detection system, in accordance with one or more arrangements.

FIG. 7 shows a flowchart of an example process for control of a safety device 210 by control system 206 in response to detection of workers 16 by worker detection system 208, in accordance with one or more arrangements. In this example arrangement, when the process is initialized, the process loops at decision block 302 until a worker detection system 208 indicates that a worker 16 is detected. If a worker 16 is detected by detection device 216 (located in and/or proximate to the area of interest), the process proceeds from decision block 302 to decision block 304. At decision block 304, the process checks to see if the detected worker 16 and/or wearable device 12 is included in a list of workers 16 present at the location of interest (e.g., area 222 adjacent to loading dock 204). In this example, if an identifier for the detected worker 16 and/or wearable device 12 is already specified in a list of workers 16 present at the location, the process loops back to decision block 302, where the process waits for another worker 16 to be detected.

In this example, if an identifier for the detected worker 16 and/or wearable device 12 is not included in the list of workers 16 present at the location, the identifier is added to the list at process block 306. If the added ID is not the first entry in the list, the process loops back to decision block 302. Otherwise, if the added ID is the first entry in the list, the process proceeds to process block 310, where control system 206 prevents a safety device 210 for the area (e.g., area 222) from being disengaged by a user. The process then loops back to decision block 302.

If at decision block 302, a worker 16 is detected by detection device 218 (located away from the area of interest 222), the process proceeds from decision block 302 to decision block 314. At decision block 314, the process checks to see if the ID for the detected worker 16 and/or wearable device 12 is included in a list of workers 16 present at the area of interest (e.g., area 222.

If the ID is not included in the list, the detection of the worker 16/wearable device 12 does not affect the status of workers 16 present in the area of interest 222. Accordingly, the process loops back to decision block 302, where the process waits for detection of another worker by worker detection system 208. If the ID is included in the list, it should be removed since detection device 218 has confirmed the worker 16 and/or wearable device 12 is no longer present in the corresponding area of interest 222 and should be removed from the list. Accordingly, the process proceeds from decision block 314 to process block 316, where the ID is removed from the list. If the list is empty after removal at decision block 318, it is confirmed that workers 16 are no longer present in the location of interest 222. Accordingly, the process proceeds to process block 320, where control system 206 enables the safety device 210 for the location to be disengaged by a user. The process then loops back to decision block 302 and repeats.

In this manner, control system 206 tracks presence of workers 16 in the area of interest 222 based on the most recent detection provided by worker detection system 208. More specifically, once a worker 16 is detected in the area of interest, control system 206 assumes the worker 16 is present until the worker detection system 208 confirms that the particular worker 16 has been detected elsewhere.

Figure 8:
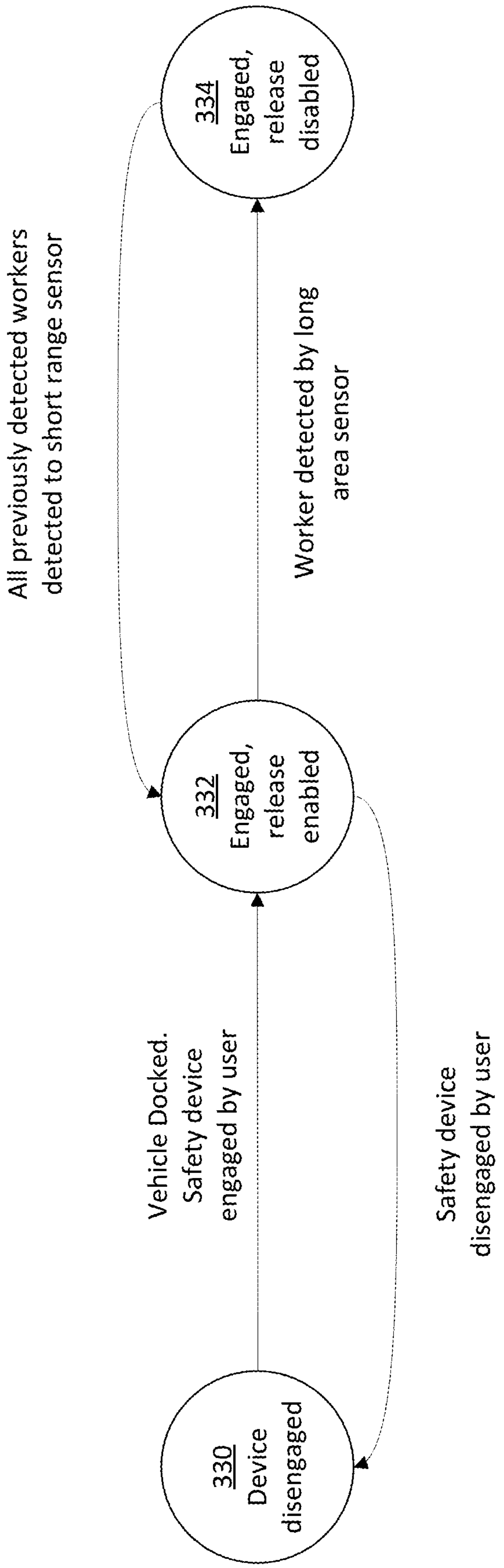
FIG. 8 shows a state diagram of a process for controlling a safety device based on determined presence of workers in a particular area of interest, in accordance with one or more arrangements.

FIG. 8 shows a state diagram of a process for controlling a safety device 210 based on determined presence of workers 16 in a particular area of interest (e.g., 204). In this example, when control system 206 is in state 330, the safety device 210 is disengaged. For example, in the context of a vehicle restraint 212 type safety device 210, when the vehicle restraint is disengaged, a truck 202 in the loading dock 204 if able to be moved and workers 16 in the immediate area are potentially at risk of injury when such truck 202 is moved. In this example, once a truck 202 is docked and the vehicle restraint 212 is engaged by a user, control system 206 transitions to state 332. When control system 206 is in state 330, no workers 16 are present in the area of interest 222. In state 332, control system 206 enables users to disengage the vehicle restraint 212. If vehicle restraint 212 is disengaged, the control system 206 transitions back to state 330. In this example, if vehicle restraint 212 is engaged and one or more workers 16 are present in the area of interest 222, control system 206 transitions to state 334. In state 332, control system 206 does not permit users to disengage the vehicle restraint 212. Once no workers 16 are present in the area of interest 222, control system 206 transitions back to state 332, where users are permitted to disable the vehicle restraint 212.

For ease of explanation, the examples and arrangements may be primarily described with reference to tracking presence of workers 16 and controlling operation of safety device(s) 210 in a single area of interest (e.g., area 222). However, the arrangements are not so limited. Rather, it is contemplated that in some arrangements, control system 206 and/or worker detection system 208 may be configured to track presence of workers in a plurality of areas of interest.

Figure 9:
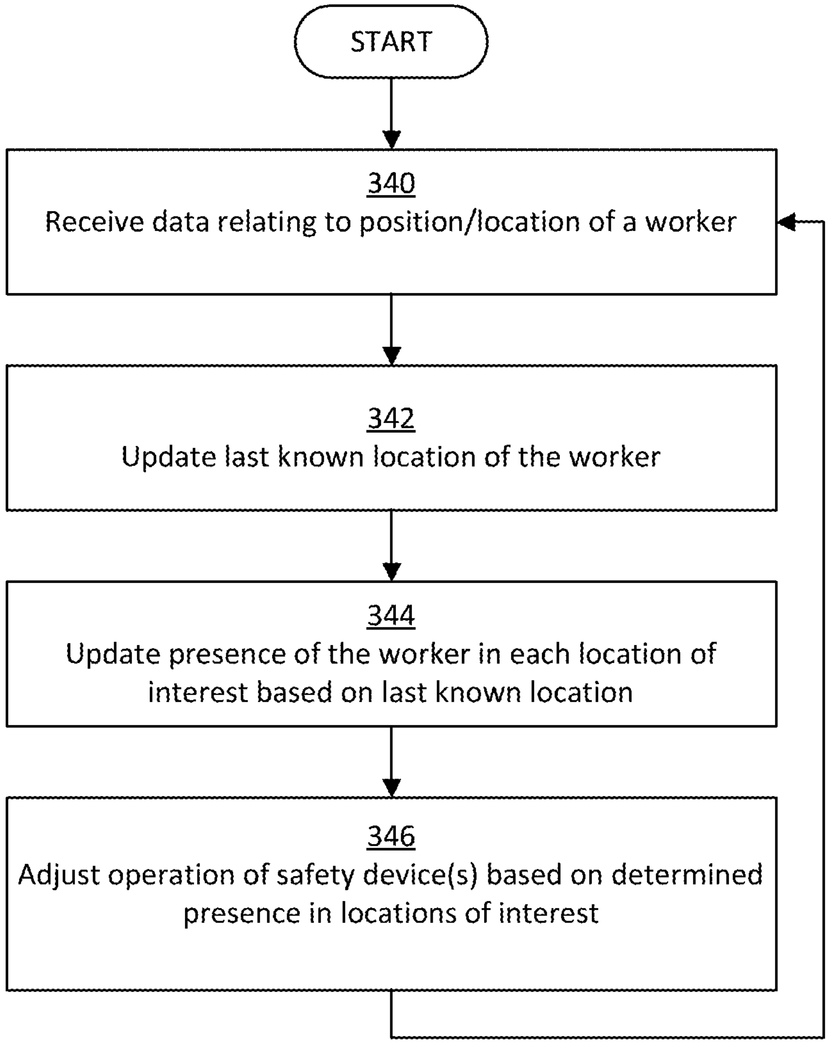
FIG. 9 shows a flowchart of example process for tracking of worker presence using data provided by worker detection system that may be applied to track worker presence for multiple areas of interest, in accordance with one or more arrangements.

FIG. 9 shows a flowchart of example process for tracking of worker 16 presence using data provided by worker detection system 208 that may be applied to track worker 16 presence for multiple areas of interest, in accordance with one or more arrangements. In this example, at process block 340, data relating to position/location of a worker 16 is received. At process block 342, the last known location of the worker 16 is updated. At process block 344, presence of the worker 16 in each area of interest that is tracked by system 200 is updated based on the last known location of the worker 16. For example, in one or more arrangements, control system 206 may maintain a respective list of present workers 16 for each area of interest that is tracked. When new location/position information of a worker 16 is received, control system 206 may add the worker 16 to a particular list, remove the worker 16 from a particular list, and/or move the worker 16 from the list for one area to the list for another area. At process block 344, presence of workers 16 for each area of interest that is tracked is updated. At process block 346, operation of safety devices 210 are adjusted based on the updated presence of workers 16 in the areas of interest. The process then loops back to process block 340 and the process is repeated.

While some examples and arrangements may be primarily described with reference to control system 206 tracking the particular workers 16 present in potentially dangerous location(s) based on information received from worker detection system 208, the arrangements are not so limited. Rather, it is contemplated that in one or more arrangements worker detection system 208 may be configured to track the particular workers 16 present in potentially hazardous location(s) and report determined presence status in the location to control system 206 (or other component or system).

Other Automated Control by Control System 206

Although in one or more arrangements, control system 206 may be described in the context of controlling safety devices 210 based on the detected presence and/or location of workers the arrangements are not so limited. Rather, it is contemplated that in one or more arrangements, control system 206 may be configured to perform various control processes 228 to operate various systems, devices, and/or equipment or perform various tasks in response to worker 16 presence, worker location, and/or other information received from wearable devices 12.

In one or more arrangements, control processes 228 of control system 206 may be configured to control access to and/or operation of company resources based on location of workers 16. For example, in one of more arrangements, control processes 228 are configured to control one or more remote locking devices 230 (not shown) to control access to and/or operation of company resources.

Remote locking devices 230 are formed of any suitable size, shape and design and are configured to prevent physical access to or use of company resources when in a locked state and permit physical access to or use of the company resources when in an unlocked state. Remote locking devices 230 may be used to restrict access and use of various company resources including but not limited to, for example, facilities, rooms, lockers, drawer, cabinets, elevators, doors, tools, machinery, computing systems, digital resources and/or phones to name a few. In this example arrangement, remote locking device 230 also includes a locking mechanism. The locking mechanism is formed of any suitable size, shape and design and is configured to restrict access or operation to a particular resource in a locked state and permit access to or operation of the resource in the unlocked state.

In some various different arrangements, control processes 228 of control system 206 may control access to and/or operation of company resources using various processes. In one or more arrangements, control processes 228 of control system 206 is configured to monitor location of workers 16 using data received from worker detection system 208 and/or wearable devices 12 during a work shift and perform various operations in response to workers 16 being in specific locations.

In some various different arrangements, location of workers 16 may be monitored using various means and/or methods. For instance, in one or more arrangements, wearable devices 12 of workers 16 are configured to periodically and/or continuously communicate data to control system 206 indicating location of wearable devices 12 of workers 16. Additionally or alternatively, in one or more arrangements, control system 206 may be configured to monitor location of workers 16 by receiving notifications when wearable devices 12 are in close proximity to various device (e.g., remote locking devices 230)

In one or more arrangements, control processes 228 may be implemented as a set of rules in a database (e.g., database) 60 listing of geographic locations or zones and actions to be performed when workers 16 are determined to be located in the specific geographic locations or zones. In one or more arrangements, such rules may be modified by an authorized user via user interface 72 (or another user interface). As one illustrative example, the rules in database may cause control processes 228 to cause a safety device 210 and/or locking device 230 to turn off and/or disable an inherently dangerous machine in response to location data indicating a worker 16 is in an area of close proximity to the inherently dangerous machine.

In one or more arrangements, control processes 228 of control system 206 may be configured to perform different actions in response to workers 16 being in a particular area or provide different levels of access to different workers 16. For example, in one or more arrangements, control processes 228 are configured to maintain a listing of workers 16 and respective access and use permission in database. In one or more arrangements, permitted accesses and uses may be modified by an authorized user via user interface 72, for example. As one illustrative example, in one or more arrangements control processes 228 are configured to provide worker-specific access to company resources.

As one example implementation, when a wearable device 12 is in close proximity to remote locking device 230 while in a locked state, wearable device 12 transmits the unique ID of the wearable device 12 to remote locking device 230. In response to receiving the unique ID, remote locking device 230 sends a query to control processes 228 of control system 206 to determine if the worker 16 associated with the unique ID should be granted access. In response to receiving the query, control processes 228, determine the worker 16 associated with unique ID and then determines from database if the worker 16 has permission to access the resource associated with the remote locking device 230. Control processes 228 of control system 206 then provides a response to the remote locking device 230 indicating whether or not the worker 16 is to be permitted access. If the response indicates that the worker 16 is permitted access, the remote locking device 230 transitions to the unlocked state remains in the locked state. Otherwise, the remote locking device 230 remains in the locked state.

When transitioning to the unlocked state, some remote locking devices 230 may remain in the unlocked state for a certain period of time. For example, a remote locking device 230 connected to a door, may transition to an unlocked state for 5 seconds to permit a permitted worker 16 to open the door. Conversely, some remote locking devices 230 may be configured to remain in the unlocked state while the wearable device 12 having the unique ID remains in close proximity. For example, a remote locking device 230 connected to a milling machine, may remain unlocked to permit use by an authorized worker 16.

In one or more arrangements, control processes 228 of control system 206 are configured to track training and/or certification status of workers 16 for use of certain machines and/or equipment. For example, workers 16 may be required to complete yearly safety training to operate potentially dangerous machines. In one or more arrangements, control processes 228 may be configured to automatically update access control permission for workers 16 in response to changes in training and/or certification status. For example, control processes 228 may update access control permissions to deny a worker 16 access to a particular machine in response to determining that a certification of the worker has expired. Conversely, control processes 228 may update access control permissions to permit the worker 16 access to the machine in response to determining that the worker 16 has been recertified.

One benefit of using wearable devices 12 to detect presence of workers 16 is that control system 206 may additionally or alternatively control operation of various other equipment and/or devices based on data gathered by various sensors 22 of wearable devices 12 and/or data metrics derived therefrom. For example, in one or more arrangements, control system 206 may be configured to generate control signals and/or control switching of one or more relay switches (not shown) in response to detection of wearable devices 12, and/or based on sensor data gathered by such wearable devices 12. Such control signals and/or relay switches may be configured to control operation of various devices (e.g., lights, alarms, locks, doors, and/or any other devices) based on presence of and/or data received from wearable devices 12.

As an illustrative example, in one or more arrangements, control system 206 is configured to control a relay switch connected to a door lock to control access to a restricted area. For example, in one or more arrangements, control is initiated by detection of a wearable device 12 by a worker detection system 208 that is configured to detect a wearable device 12 of a worker 16 when the worker 16 is in close proximity to the door.

To access the door, the worker 16 holds their wearable device 12 up to worker detection system 208. This causes wearable device 12 to communicates data identifying the worker to the worker detection system 208. Worker detection system communicates the data to control system 206. In this illustrative example, in response to receiving the data, control system 206 determines what equipment is controlled by presence of the worker 16, actions to be performed, criteria for performing such actions, and required permissions to perform such action. In this example, control system 206 determines that the worker detection system 208 controls a relay for the door lock and determines that the identified worker 12 has permissions required for access. Accordingly, control system 206 causes relay to unlock the door for a period of time to permit the worker 16 to open the door. If the control system 206 determines the worker 16 does not have required permissions, the control system 206 does not cause relay to unlock the door. Additionally, in one or more arrangements, control system 206 may perform various additional actions including but not limited to, providing an indicator to indicated access approved and/or denied, logging access or access attempt, notifying security, and/or any other action and/or process.

Example User Interface 72

In one or more arrangements, control system 206 and/or monitoring system 14 may provide one or more user interfaces 72 to facilitate access and evaluation of data collected from wearable devices and analytics derived therefrom and/or configure settings and/or operation of system 200 components. In one or more arrangements, user interface 72 and/or other processes may be configured to provide one or more dashboard interfaces to facilitate review and/or evaluation of information and/or data metrics received or derived by worker detection system 208 and/or control system 206 (e.g., information indicative of worker occupancy in various areas and status of safety system and/or other useful information).

Figure 10:
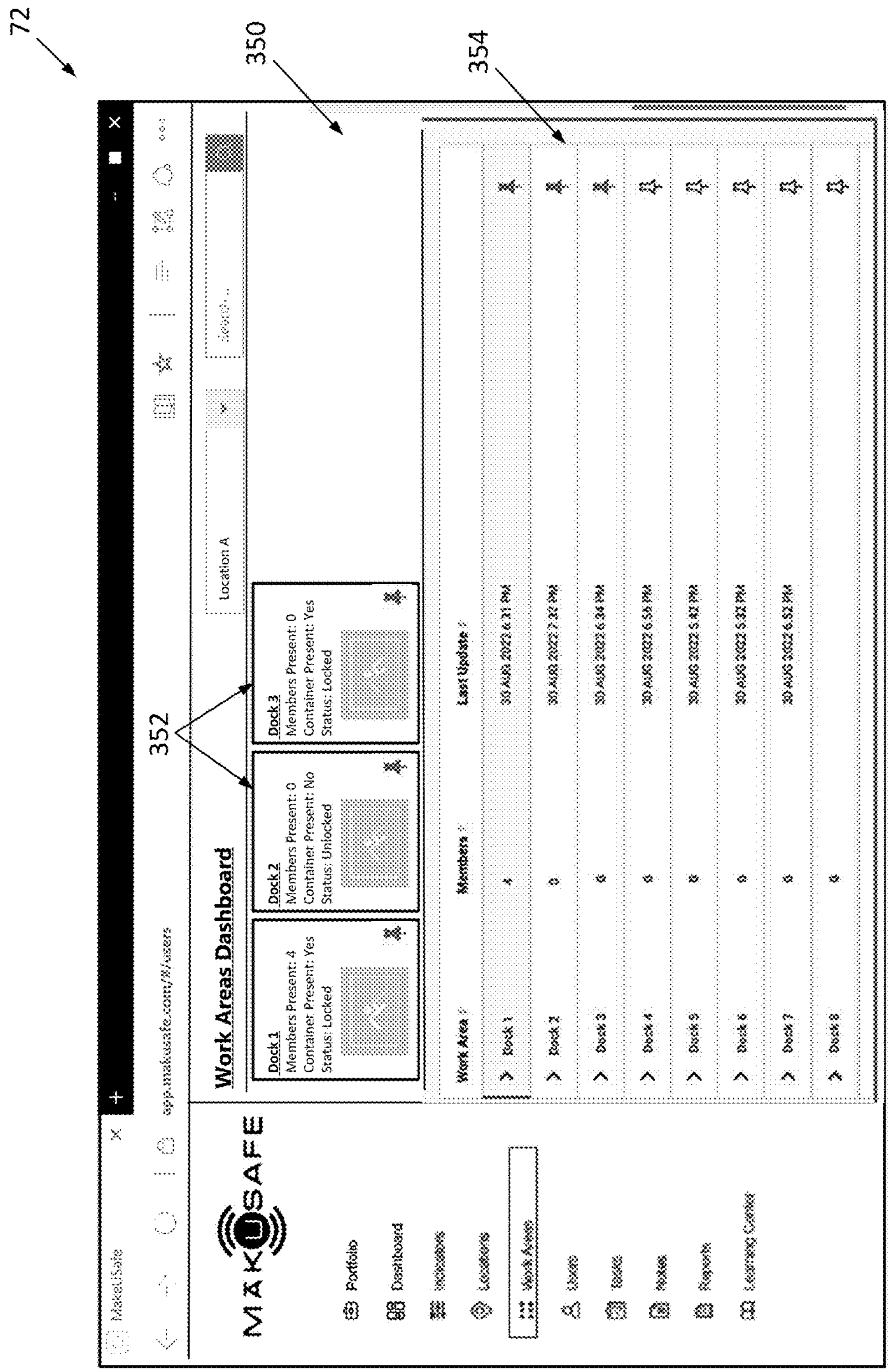
FIG. 10 shows a screen shot of an example user interface having a Work Areas dashboard, in accordance with one or more arrangements.

FIG. 10 shows a screen shot of an example user interface 72 having a Work Areas dashboard, consistent with one or more arrangements. In this illustrative example, the Work Areas dashboard provides a number of various different tools to facilitate review and/or evaluation of information for different work areas of a facility. In this example arrangement, the Work Areas dashboard includes an upper display panel 350 having tile summaries 352 for each work area. In this example arrangement, the tile summaries 352 indicate a name or identifier for each work area, the number of workers 16 in the work area, and a visual representation of the work area. In this example arrangement, some tile summaries 352 includes an image/photo of the work area while some other tiles include a video display of the work area.

In this example arrangement, the Work Areas dashboard has a lower display panel 354 having collapsible lists of each work area. In this example arrangement, lower display panel 354 dashboard lists summarizes the number of workers 16 present in the work area along with the time occupancy status was last updated. In this example arrangement, the Work Areas dashboard permits a user to select criteria to filter and/or sort worker entries and/or work areas displayed. In this example arrangement, a user may select a pin button on the right side of an entry in lower display panel 354 to pin that work area in upper display panel 350. In this example arrangement, a user may select a button on the left side of an entry in lower display panel 354 to expand the entry and show detailed information for the particular work area. Such detailed information may include various information including but not limited to, for example, individual workers 16 currently present in the work area, the time each worker 16 entered the work area, status of various safety devices 210, locking devices 230 or other devices in the work area controlled by control system 206, and/or any other useful information.

Figure 11:
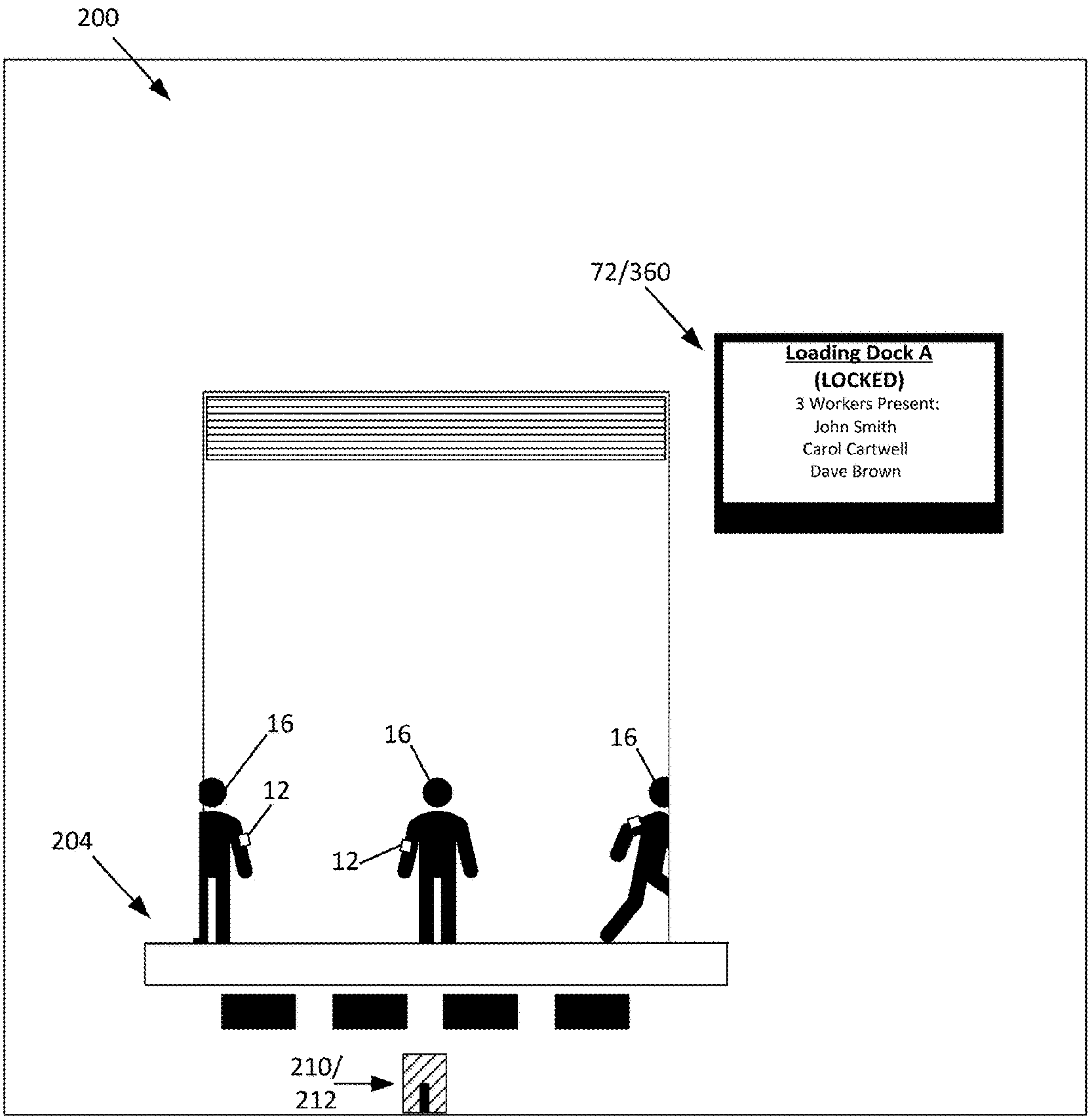
FIG. 11 shows an outside view of a loading dock of a shipping facility with an on-site status monitor positioned above the loading dock.

In one or more arrangements, user interface 72 is configured to provide a real time occupancy status summary for use on-site (e.g., at a loading dock or other area of interest). As an illustrative example, FIG. 11 shows an outside view of a loading dock 204 of a shipping facility 100 with an on-site status monitor 360 positioned above the loading dock 204. In this example, the on-site status monitor 360 indicates the name of the loading dock 204, status of the loading dock safety device 210-212 (e.g., locked/unlocked), and the workers 16 currently present at the loading dock 204. In this example, the on-site status monitor 360 allows a driver to quickly and easily review status of safety devices and worker presence around the loading dock. In this manner, a driver can verify a truck is locked to the loading dock and/or if worker 16 presence permits the safety device 212 to be disabled.

From the above discussion, it will be appreciated that one or more arrangements provide a wearable device, system, and/or method of use that improves upon the state of the art; that manages operation of safety equipment using a worker detection system; that manages operation of safety equipment based on presence of workers; that manages operation of safety equipment using wearable devices to track presence of workers; that accurately tracks location of workers during a work shift; that aggregates a great amount of information about the work performed by workers and workplace conditions; that eliminates bias in the collection of information about the work performed by workers and workplace conditions; that eliminates the inconsistency in reporting information about the work performed by workers and workplace conditions; that analyzes data gathered to assess risk posed to workers at multiple times throughout a work shift; that aggregates a great amount of information indicative of work performed by workers and workplace conditions to facilitate data analytics; that assesses gathered data indicative of work performed by workers and workplace conditions to facilitate assessment of safety risks faced by workers during a work shift; that is cost effective; that is safe to use; that is easy to use; that is efficient to use; that is durable; that is robust; that can be used with a wide variety of facilities; that is high quality; that has a long useful life; that can be used with a wide variety of occupations; that provides high quality datal; and/or that provides data and information that can be relied upon, among countless other advantages and improvements. These and countless other objects, features, or advantages of the present disclosure will become apparent from the specification, figures, and claims.

SELECTED REFERENCE NUMBERS

10—System
12—Wearable Devices
14—Monitoring System
16—Worker
18—Charging Base
20—Network
22—Sensors
24—Electronic Circuit
26—Power source
28—Attachment Member
32—Communication Circuit (of Electronic Circuit 24)
34—Processing Circuit (of Electronic Circuit 24)
36—Memory
38—Software Code
42—Back Wall (of Charging Base 18)
44—Sockets (of Charging Base 18)
46—User Interface (of Charging Base 18)
60—Database
62—Data Processing System
70—Analytics Processes
72—User Interface
74—Management Software
200—Shipping Facility Safety System
202—Truck/Shipping Container
204—Loading Dock (of Shipping Facility 100)
206—Control System (of System 200)
208—Worker Detection System (of System 200)
210—Safety Device
212—Restraint Device (of Safety Device 210)

216—Detection Device (of Worker Detection System 208)

218—Detection Device (of Worker Detection System 208)

222—Adjacent Area (of Worker Detection System 208)

224—Distant Area (of Worker Detection System 208)

228—Control Processes (of Control System 206)

230—Locking Device

302—Decision Block

304—Decision Block

306—Process Block

308—Decision Block

310—Process Block

314—Decision Block

316—Process Block

318—Decision Block

320—Process Block

330—State

332—State

334—State

340—Process Block

342—Process Block

344—Process Block

346—Process Block

350—Upper Display Panel (of User Interface 72)

352—Tile Summaries (of Upper Display Panel 350)

354—Lower Display Panel (of User Interface 72)

360—On-site Status Monitor

What is claimed:

1. A system for controlling a safety device, comprising:
   a plurality of wearable devices configured to be worn by workers during a work shift;
   a safety device;
   the safety device configured to prevent injury to workers present in a first area when the safety device is enabled;
   a worker detection system configured to detect presence of the workers by detecting the wearable devices worn by the workers during the work shift;
   the worker detection system configured to detect presence of the plurality of wearable devices in a first area and in a second area that is separate from the first area;
   a control system;
   the control system communicatively connected to the worker detection system;
   wherein the control system is configured to track workers present in the first area based on detection of the plurality of wearable devices by the worker detection system;
   wherein the control system is configured to prevent the safety device from being disabled when the control system determines one or more workers are present in the first area;
   wherein the control system is configured to permit the safety device to be disabled when the control system determines no workers are present in the first area.

2. The system of claim 1, wherein the plurality of wearable devices have respective unique identifiers;
   wherein the control system is configured to add a first one of the unique identifiers for a first one of the plurality of wearable devices to a list in response to the worker detection system detecting the first one of the plurality of wearable devices in the first area and the first one of the unique identifiers being absent from the list;
   wherein the control system is configured to remove the first one of the unique identifiers from the list in response to the first one of the unique identifiers being present in the list and the worker detection system detecting the first one of the plurality of wearable devices in the second area.

3. The system of claim 1, wherein the worker detection system includes a first detection device positioned in the first area;
   the first detection device configured to detect the plurality of wearable devices within a first proximity range of the first detection device;
   wherein the worker detection system includes a second detection device positioned in the second area;
   the second detection device configured to detect the plurality of wearable devices within a second proximity range of the second detection device.

4. The system of claim 1, wherein the worker detection system includes a first detection device positioned in the first area;
   the first detection device configured to detect the plurality of wearable devices within a first proximity range of the first detection device;
   wherein the worker detection system includes a second detection device positioned in the second area;
   the second detection device configured to detect the plurality of wearable devices within a second proximity range of the second detection device;
   wherein the second proximity range is smaller than the first proximity range.

5. The system of claim 1, wherein the plurality of wearable devices include one or more sensors;
   wherein the plurality of wearable devices are configured to communicate data from the one or more sensors to the worker detection system using a wireless communication protocol.

6. The system of claim 1, wherein the plurality of wearable devices include one or more sensors;
   wherein the plurality of wearable devices are configured to communicate data from the one or more sensors to the worker detection system using a wireless communication protocol;
   wherein the worker detection system is configured to detect the plurality of wearable devices by detecting wireless transmission from the plurality of wearable devices.

7. The system of claim 1, wherein each of the plurality of wearable devices are configured to communicate data indicative of position of the wearable device to the worker detection system.

8. The system of claim 1, wherein each of the plurality of wearable devices are configured to communicate GPS data indicative of position of the wearable device to the worker detection system.

9. The system of claim 1, wherein the safety device is a vehicle restraint device.

10. The system of claim 1, wherein the safety device is a dock lift.

11. The system of claim 1, wherein the safety device is a lock for a loading dock door.

12. The system of claim 1, wherein the safety device is an interlock for a piece of mechanized equipment.

13. The system of claim 1, wherein the first area is located proximate to a loading dock.

14. The system of claim 1, wherein the worker detection system is configured to detect presence of the workers by detecting Bluetooth signals transmitted by the wearable devices worn by the workers.

15. The system of claim 1, wherein the worker detection system includes a first detection device positioned in the first area;

wherein the worker detection system includes a second detection device positioned in the second area;

wherein, in response to one of the first detection device or the second detection device detecting a Bluetooth signal transmitted by one of the wearable devices, the worker detection system is configured to determine a distance between one of the plurality of wearable devices and the first detection device or the second detection device based on a signal strength of the Bluetooth signal.

16. A system for controlling a safety device, comprising:

a plurality of wearable devices configured to be worn by workers during a work shift;

a safety device;

the safety device configured to prevent injury to workers present in a first area when the safety device is enabled;

a worker detection system configured to determine position of the wearable devices during the work shift;

a control system;

the control system communicatively connected to the worker detection system;

the control system configured to receive position data indicative of the positions of the plurality of wearable devices determined by the worker detection system;

wherein the control system is configured to track workers present in the first area based on the position data;

wherein the control system is configured to prevent the safety device from being disabled when the control system determines one or more of the workers are present in the first area;

wherein the control system is configured to permit the safety device to be disabled when the control system determines no workers are present in the first area.

17. The system of claim 16, wherein the position data indicates GPS location data indicating positions of the plurality of wearable devices.

18. The system of claim 16, wherein the position data indicates wireless access points to which the plurality of wearable devices are connected.

19. The system of claim 16, wherein the position data indicates devices which have detected Bluetooth signals of the wearable devices.

20. The system of claim 16, wherein the position data indicates locations where workers have checked in with the worker detection system using the plurality of wearable devices.

21. The system of claim 16, wherein the plurality of wearable devices have respective unique identifiers;

wherein the control system is configured to add a first one of the unique identifiers for a first one of the plurality of wearable devices to a list in response to a position of the worker indicated by the worker detection system being located within the first area;

wherein the control system is configured to remove the first one of the unique identifiers from the list in response to the first one of the unique identifiers being present in the list and the position of the worker indicated by the worker detection system being located in a second area;

wherein the second area is separated from the first area.

22. The system of claim 16, wherein the worker detection system includes a first detection device positioned in the first area;

the first detection device configured to detect the plurality of wearable devices within a first proximity range of the first detection device;

wherein the worker detection system includes a second detection device positioned in a second area that is separated from the first area;

the second detection device configured to detect the plurality of wearable devices within a second proximity range of the second detection device.

23. The system of claim 16, wherein the worker detection system includes a first detection device positioned in the first area;

the first detection device configured to detect the plurality of wearable devices within a first proximity range of the first detection device;

wherein the worker detection system includes a second detection device positioned in a second area that is separate from the first area;

the second detection device configured to detect the plurality of wearable devices within a second proximity range of the second detection device;

wherein the second proximity range is smaller than the first proximity range.

24. The system of claim 16, wherein the plurality of wearable devices include one or more sensors;

wherein the plurality of wearable devices are configured to communicate data from the one or more sensors to the worker detection system using a wireless communication protocol.

25. The system of claim 16, wherein the plurality of wearable devices include one or more sensors;

wherein the plurality of wearable devices are configured to communicate data from the one or more sensors to the worker detection system using a wireless communication protocol;

wherein the worker detection system is configured to detect the plurality of wearable devices by detecting wireless transmission from the plurality of wearable devices.

26. The system of claim 16, wherein each of the plurality of wearable devices are configured to communicate data indicative of position of the wearable device to the worker detection system.

27. The system of claim 16, wherein the safety device is a vehicle restraint device.

28. The system of claim 16, wherein the safety device is a dock lift.

29. The system of claim 16, wherein the safety device is a lock for a loading dock door.

30. The system of claim 16, wherein the safety device is an interlock for a piece of mechanized equipment.

31. The system of claim 16, wherein the first area is located proximate to a loading dock.

32. A system, comprising:

a plurality of wearable devices configured to be worn by workers during a work shift;

the wearable devices having a plurality of sensors;

a monitoring system;

a safety device;

the safety device configured to prevent injury to workers present in a first area when the safety device is enabled;

wherein the monitoring system includes a worker detection system configured to determine position of the wearable devices during the work shift;

wherein the monitoring system includes a control system;

the control system communicatively connected to the worker detection system;

the control system configured to receive position data indicative of the positions of the plurality of wearable devices determined by the worker detection system;

wherein the control system is configured to track workers present in the first area based on the position data;

wherein the control system is configured to prevent the safety device from being disabled when the control system determines one or more of the workers are present in the first area;

wherein the control system is configured to permit the safety device to be disabled when the control system determines no workers are present in the first area.

33. The system of claim 32, wherein the monitoring system is configured to perform analytics on the data received from the wearable devices.

34. The system of claim 32, wherein the monitoring system is configured to perform analytics on the data received from the wearable devices to quantify physicality exhibited by the worker during the work shift.

35. The system of claim 32, wherein the monitoring system is configured to perform analytics on the data received from the wearable devices to identify potentially dangerous events.

36. The system of claim 32, wherein the monitoring system is configured to perform analytics on the data received from the wearable devices to identify repetitive motions of the worker.

* * * * *